United States Patent [19]

Bertsch et al.

[11] Patent Number: 5,053,496

[45] Date of Patent: Oct. 1, 1991

[54] LOW VISCOSITY STATISTICAL MONOFUNCTIONAL CARBOXYLIC-TERMINATED, AMINE-TERMINATED, OR EPOXY-TERMINATED REACTIVE LIQUID RUBBER POLYMERS, AND A PROCESS FOR PREPARATION THEREOF

[75] Inventors: Robert J. Bertsch, Brecksville; Alan R. Siebert, Orange Village, both of Ohio

[73] Assignee: The BF Goodrich Company, Akron, Ohio

[21] Appl. No.: 515,793

[22] Filed: Apr. 27, 1990

[51] Int. Cl.[5] ............. C08L 23/02; C08L 25/04; C08L 31/04; C08L 33/00
[52] U.S. Cl. ................................ 534/886; 534/573; 534/838; 524/190
[58] Field of Search ............ 534/838, 886, 573 P; 524/190

[56] References Cited

U.S. PATENT DOCUMENTS

| | | | |
|---|---|---|---|
| 2,565,573 | 8/1951 | Plase et al. | 534/838 |
| 2,586,995 | 2/1952 | Robertson | 534/838 |
| 3,285,949 | 11/1966 | Siebert | 524/190 X |
| 3,823,107 | 7/1974 | Cotton | 524/190 X |
| 4,039,527 | 8/1977 | Nagaoka et al. | 534/838 |
| 4,045,427 | 8/1977 | Sheppard et al. | 534/838 X |
| 4,075,286 | 2/1978 | MacLeay et al. | 534/886 X |
| 4,684,717 | 8/1987 | Ashitaka et al. | 534/886 X |

*Primary Examiner*—Mary C. Lee
*Assistant Examiner*—Fiona T. Powers
*Attorney, Agent, or Firm*—Daniel J. Hudak

[57] ABSTRACT

The present invention generally relates to statistical monofunctional terminated reactive liquid rubbers including a statistical monofunctional carboxylic-terminated reactive liquid rubber, a statistical monofunctional amine-terminated reactive liquid rubber, and a statistical monofunctional epoxy-terminated reactive liquid rubber. These polymers are pourable, making them useful in a variety of applications particularly as toughening agents for epoxy resins to which they impart good physical properties.

109 Claims, 1 Drawing Sheet

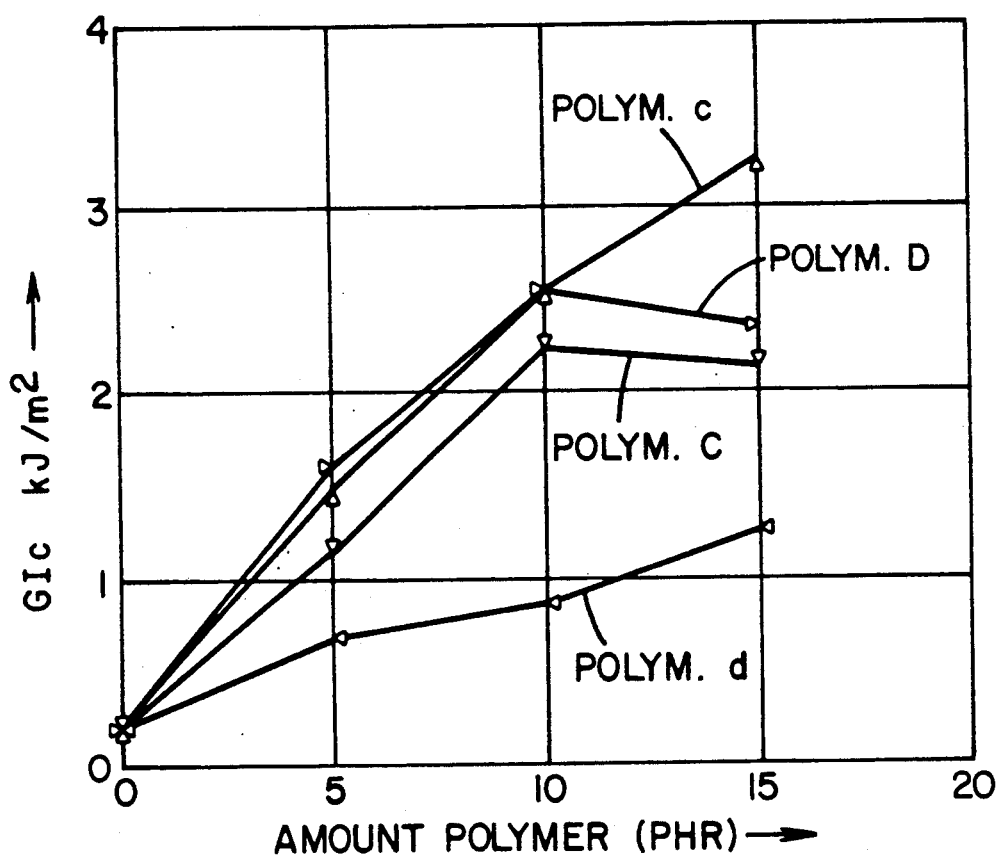

LOW VISCOSITY STATISTICAL MONOFUNCTIONAL CARBOXYLIC-TERMINATED, AMINE-TERMINATED, OR EPOXY-TERMINATED REACTIVE LIQUID RUBBER POLYMERS, AND A PROCESS FOR PREPARATION THEREOF

FIELD OF THE INVENTION

The present invention generally relates to low viscosity elastomeric reactive liquid polymers In one aspect, the invention specifically relates to a low viscosity statistical monofunctional amine-terminated liquid polymer, in another aspect to a statistical monofunctional carboxylic-terminated liquid polymer, and in yet another aspect to a statistical monofunctional epoxy-terminated liquid polymer. The invention also relates to a method for making the above monofunctional polymers.

BACKGROUND ART

The ability of a brittle or thermoset resin to absorb energy without catastrophic failure can be increased through flexibilizing or toughening. Flexibilizing and toughening may be accomplished by reacting or compounding the resin with an elastomer thereby enhancing the resin system's ability to resist mechanical and thermal stress. Such elastomers are known and include reactive liquid polymers such as dicarboxyl-terminated polymers as exemplified by U.S. Pat. No. 3,285,949, and diamine-terminated polymers, as disclosed in U.S. Pat. No. 3,823,107. It is also known that liquid dicarboxyl-terminated polymers have the advantage of a material which is pourable and castable at room temperature and because of the reactive functional chain ends it can be further reacted at elevated temperature by the addition of polyamine compounds, to form the liquid diamine-terminated polymers. Such liquid elastomers have found a wide variety of utility, but are particularly useful as toughening agents in sealant, caulk, adhesive, and potting epoxy resin systems. In fact, heretofore it was believed that difunctionality of these polymers was essential to achieving desirable physical properties of the resins incorporating the elastomers. This thinking is typified by U.S. Pat. Nos. 3,823,107, 3,285,949, and the article "The Chemistry of Rubber Toughened Epoxy Resins I." by A. R. Siebert and C. K. Riew. Improvements in such properties as the impact strength and crack resistance of resins incorporating amine and carboxyl-terminated polymers have been attributed to their difunctional character. The terminal amine or carboxyl functionality at or close to two was believed essential to obtaining maximum toughness and therefore polymers having lesser functionality were thought to be unsuitable.

SUMMARY OF THE INVENTION

It has now surprisingly been discovered that physical properties may not be sacrificed, and in some instances may even be improved, by incorporating a statistical carboxyl-terminated monofunctional polymer, a statistical amine-terminated mononfunctional polymer, or a statistical epoxy-terminated monofunctional polymer derived therefrom, or combinations thereof, into an epoxy resin. The statistical monofunctional terminated polymers of the present invention generally have viscosity values which are generally less than one-half that of an equivalent di-terminated polymer making it desirable for uses not before available to more viscous difunctional polymers such as low temperature applications. These low viscosity statistical monofunctional carboxyl- or amine- or epoxy-terminated polymers are suitable as toughening agents in sealant, caulk, and adhesive epoxy resin systems. With regard to the statistical monofunctional amine-terminated polymer, it is made from the carboxyl-terminated polymer utilizing a polyamine in an amine mole ratio of generally at least 1:1 up to about 5.0 to that of the statistical monofunctional carboxyl-terminated polymer so that reduced amounts of unreacted or excess amine are contained in the composition.

DETAILED DESCRIPTION OF THE INVENTION

The polymeric compositions of the present invention are generally the reaction product of various components such as vinyl-containing monomers and various initiators and result in a statistical monofunctional carboxyl-terminated reactive liquid rubber polymer from which can be made a statistical monofunctional amine-terminated reactive liquid rubber polymer, or a statistical epoxy-terminated reactive liquid rubber polymer. The polymeric composition is thus actually a blend or a mixture of difunctional polymers, monofunctional polymers, and nonfunctional polymers, generally containing an average functionality per polymer of from about 0.2 to about 1.8, desirably from about 0.7 to about 1.3, and preferably approximately one, and hence is referred to as a statistical monofunctional polymer. The various carboxyl-terminated polymers, the various amine-terminated polymers, as well as the various epoxy-terminated polymers can be blended together or mixed to form blends thereof. Considering the monofunctional terminated reactive liquid rubber polymer, it contains either a terminal carboxyl group, a terminal amine group, or a terminal epoxy group at one end of the polymer chain, and a non-reactive group at the other end of the polymer chain. Each terminus is derived from a fragment of the initiators used in synthesis employed to make the polymers. When the particular polymer is a difunctional terminated polymer, it will contain either a terminal carboxyl group, a terminal amine group, or a terminal epoxy group at both ends of the polymer chain. When the polymer is a nonfunctional polymer, it will contain nonfunctional groups on each end of the polymer chain.

Considering the monofunctional carboxyl-terminated polymer, it is made by reacting a vinyl-containing monomer with a difunctional initiator as well as a nonfunctional initiator and can be generally indicated by the structural formula

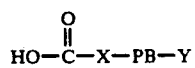

wherein

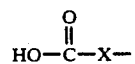

is derived from the difunctional initiator and —Y is derived from the nonfunctional initiator and wherein —PB— represents the carbon-carbon backbone of the polymer. Generally, the difunctional carboxyl-terminated polymer is generally represented by the structural formula $$HO-\overset{O}{\overset{\|}{C}}-X-PB-X-\overset{O}{\overset{\|}{C}}-OH$$

The statistical monofunctional carboxyl-terminated polymers will contain generally a small or minority amount of polymers generally represented by the structural formula $$Y-PB-Y$$

wherein Y is derived from a nonfunctional initiator. Regardless of the amounts of the various difunctional, or monofunctional carboxyl-terminated polymers as well as the nonfunctional terminated polymers, the overall statistical monofunctional carboxyl-terminated polymeric compositions generally contain from about 0.25 to about 4.5 percent by weight of carboxyl groups based upon the total weight of the statistical polymeric composition and have an acid number of from about 3.0 to about 52.

The non-reactive terminus —Y of the molecule is referred to as such because it will not undergo condensation, as compared to the carboxyl terminus which will undergo that type of reaction. The composition of the terminus will vary depending upon the polymerization initiators used, however suitable groups include an alkyl or a nitrile.

The backbone —PB— of the statistical carboxyl-terminated polymer comprises repeating units made from any monomer which is polymerizable by any free radical reaction mechanism. The repeating unit composition of the polymer backbone may be made from a single monomer (homopolymer) or two or more monomers (copolymer). Preferably, the polymeric backbones are derived from at least one vinyl monomer having at least one terminal vinyl (CH$_2$=) group and up to 18 carbon atoms. Examples of suitable vinyl monomers include olefins having from 2 to 10 carbon atoms such as ethylene, isobutylene, dienes containing 4 to 10 carbon atoms, preferably 4 to 8 carbon atoms, such as butadiene, isoprene (2-methyl-1,3-butadiene), 2-isopropyl-1,3-butadiene and chloroprene (2-chloro-1,3-butadiene); vinyl and allyl esters of carboxylic acids containing 2 to 8 carbon atoms such as vinyl acetate, vinyl propionate and allyl acetate; vinyl and allyl ethers of alkyl radicals containing 1 to 8 carbon atoms such as vinyl methyl ether and allyl methyl ether; and acrylates having the formula $$CH_2=\overset{R}{\overset{|}{C}}-\overset{O}{\overset{\|}{C}}-OR^1$$

wherein R is hydrogen or an alkyl radical containing 1 to 3 carbon atoms, such as methyl, ethyl, propyl, and isopropyl; R$^1$ is an alkyl radical containing 1 to 18 carbon atoms, preferably 1 to 8 carbon atoms, or an alkoxyalkyl, alkylthioalkyl, or cyanoalkyl radical containing 2 to 12 carbon atoms, preferably 2 to 8 carbon atoms. Preferably, R$^1$ is an alkyl radical containing 1 to 8 carbon atoms. Suitable acrylates include ethyl acrylate, butyl acrylate, hexyl acrylate, 2-ethylhexyl acrylate, dodecyl acrylate, octadecyl acrylate, methoxyethyl acrylate, butoxyethyl acrylate, hexylthioethyl acrylate, α-cyanoethyl acrylate, cyanooctyl acrylate, methyl methacrylate, ethyl methacrylate, octyl methacrylate and the like. The polymeric backbone may comprise homopolymers of the above vinyl monomers or copolymers of two or more of the monomers.

The vinyl monomers described above may also be polymerized readily with up to about 50 percent by weight, but preferably up to about 35 percent by weight, of at least one comonomer such as a vinyl aromatic having the formula $$H_2C=\overset{R^2}{\overset{|}{\underset{R^3}{C}}}$$

wherein R$^2$ is hydrogen or methyl and R$^3$ is an aromatic moiety having from 6 to 15 carbon atoms resulting in compounds such as styrene, α-methyl styrene, chlorostyrene, and vinyl toluene; a vinyl nitrile having the formula $$CH_2=\overset{R^4}{\overset{|}{C}}-C\equiv N$$

wherein R$^4$ is hydrogen or methyl, resulting in compounds such as acrylonitrile and methacrylonitrile, respectively; vinyl acids having from 3 to 12 carbon atoms such as acrylic acid, methacrylic acid, and itaconic acid; an amide of olefinically unsaturated carboxylic acids containing 2 to 8 carbon atoms such as acrylamide and methacrylamide; or an allyl alcohol having from 3 to 10 carbon atoms.

Examples of suitable polymeric backbones include homopolymers of polyisoprene, polybutadiene, poly(vinylethylether), poly(ethylacrylate) and poly(butylacrylate); copolymers of butadiene and acrylonitrile, butadiene and styrene, vinyl acetate and isoprene, vinyl acetate and chloroprene, methyl acrylate and butadiene, methyl acrylate and ethyl acrylate, methyl acrylate and butyl acrylate, methyl acrylate and 2-ethylhexyl acrylate, ethyl acrylate and ethylene, ethyl acrylate and isobutylene, ethyl acrylate and isoprene, ethyl acrylate and butadiene, ethyl acrylate and vinyl acetate, ethyl acrylate and styrene, ethyl acrylate and chlorostyrene, ethyl acrylate and n-butyl acrylate, ethyl acrylate and 2-ethylhexyl acrylare; ethyl acrylate and acrylic acid; ethyl acrylate and acrylamide; butyl acrylate and styrene; butyl acrylate and acrylonitrile; butyl acrylate and vinyl chloride; terpolymers of butadiene, acrylonitrile, and acrylic acid; ethyl acrylate, styrene and butadiene; and ethyl acrylate, n-butyl acrylate and 2-ethylhexyl acrylate.

One group of preferred low viscosity monofunctional carboxyl-terminated polymers have copolymeric backbones comprising from about 50 percent to about 99 or 100 percent by weight of a diene monomer, such as isoprene or butadiene, and up to about 50 percent by weight of a vinyl nitrile comonomer, such as acrylonitrile, or a vinyl aromatic such as styrene. The acrylonitrile content preferably is from about 10 percent to about 35 percent, desirably, is from about 16 percent to about 26 percent, and most preferably about 16 percent. Such polymers have a carboxyl content of from about 0.4 percent to about 10 percent by weight, preferably 0.4 percent to about 2.5 percent by weight, based upon the total weight of the polymer. These lymers have a number average molecular weight of from about 1000 to about 12,000.

The greatest advantage provided by these polymers is that their viscosity is approximately one-half (½) the value of an equivalent commercially known difunctional carboxyl terminated polymer. This is demonstrated by the measured viscosities summarized in the following Table I, which compares the viscosity of the precursor statistical monofunctional polymers of the present invention versus difunctional carboxyl-terminated polymers having the same compositions of butadiene homopolymers or butadiene/acrylonitrile copolymers.

Polymers "A" and "a" are homopolymers of butadiene while polymers B/b—D/d are butadiene/acrylonitrile copolymers. The polymer designations in upper case letters represent the precursor statistical monofunctional carboxyl-terminated polymers of the present invention while the lower case letters represent structurally equivalent difunctional carboxyl-terminated polymers. The designation "EPHR" stands for Equivalents of Carboxyl Per Hundred Parts of Rubber.

TABLE I

Comparative Viscosity of Statistical Monofunctional vs. Difunctional Carboxyl Terminated Polymers

| Polymer | Acrylonitrile Content (% by weight) | Viscosity (mPa'S @ 27° C.) | Carboxyl EPHR |
|---|---|---|---|
| A | — | 22,600 | 0.022 |
| a | — | 60,000 | 0.045 |
| B | 10.2 | 30,600 | 0.025 |
| b | 10.2 | 60,000 | 0.050 |
| C | 16.8 | 65,000 | 0.022 |
| c | 16.8 | 135,000 | 0.052 |
| D | 25.9 | 202,000 | 0.024 |
| d | 25.9 | 500,000 | 0.057 |

It will be appreciated by one skilled in the art that the viscosity of individual polymers will vary depending upon the monomeric composition of the polymeric backbone. However, generally the viscosity ranges from about 10,000 mPa's to about 1.5 million mPa's. For polymers of polybutadiene or polybutadiene and acrylonitrile wherein the acrylonitrile content ranges from 0 percent to about 50 percent by weight of the polymer, the viscosity ranges from about 12,000 mPa's to about 1.5 million mPa's, preferably 15,000 mpa's to about 1 million mPa's.

Thus, the above-described low viscosity statistical monofunctional carboxyl-terminated polymers which are generally liquids, are useful as a toughening and/or flexibilizing agent for any thermoset resin system. Thermoset resins include, but are not limited to, epoxides, phenolics, alkyds and polyesters. Specific system applications can be at ambient temperatures and include those rich in resin and those rich in rubber. Resin rich system applications include one and two part adhesives, especially adhesives made of thermoset resins such as epoxy, for uses including structural adhesives in the marine, automotive and aircraft industries; electrical and electronic potting compounds and encapsulants; cast pipe; sheet molding compound other than epoxy; and bulk molding compound. Castable rubber rich system applications include rocket and missile fuel binders; and construction and civil engineering applications including roofing, flooring, water-impermeable membranes, and crack sealers.

As discussed earlier hereinabove, the significantly lowered viscosity attaches substantial advantages over known difunctional polymers. Typically, the viscous difunctional polymers require warming to reduce their viscosity and render them more workable, especially in the field. The present precursor low viscosity statistical monofunctional polymers do not require warming prior to use and will be preferred for applications which must be performed at relatively lower ambient temperatures Additionally these polymers provide faster air release and better mixing Therefore, these polymers will be preferred for applications involving mixing, which tends to entrap air, which must then be released before continuing, such as with on-site structural repair jobs In accordance with the present invention, these polymers have further utility in that they also may be reacted to produce polymers having terminal functional groups other than carboxyls, such as amines or epoxies as described in detail below.

The statistical monofunctional carboxyl-terminated polymer can be made by any conventional addition polymerization technique employing a free radical mechanism. Generally, the reaction is conducted by mixing one or more backbone-forming monomers with a mixture of a difunctional and nonfunctional initiator, and a solvent, then heating. The monomers can be one or more of the polymerizable monomers described hereinabove.

The initiator is a mixture or blend of two different initiators, namely a difunctional initiator and a nonfunctional initiator, capable of initiating a free radical polymerization.

Considering the difunctional initiator, any difunctional initiator can be used. However, one skilled in the art will appreciate that when a difunctional initiator other than an organic acid is used, conversion of the terminal groups to acid groups will be required. For example, the hydroxyl groups on hydrogen peroxide or hydroxy ethyl disulfide require conversion to acid groups. Conventional methods may be used to accomplish the conversion such as by reaction with a cyclic acid anhydride, for example succinic anhydride. Preferably the difunctional initiator is an organic azo compound or a peroxide. The organic azo initiator preferably is a bis-azocyano acid having the formula

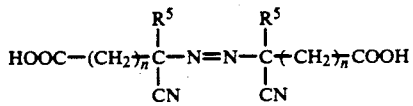

wherein $R^5$ is an alkyl group of 1-3 carbon atoms, and n is an integer from 0 to 6. The preferred acids include azodicyanobutyric acid and azodicyanovaleric acid (ADVA), with ADVA being the most preferred. The preparation of these materials is known and disclosed in U.S. Pat. Nos. 3,285,949 and 2,520,338, which are incorporated herein by reference. The organic azo initiator decomposes to form $N_2$ gas and free radicals having the formula

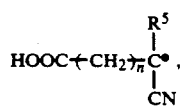

with the portion thereof having the structural formula

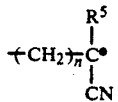

being represented by —X— in the structural formula shown above for the monofunctional carboxyl-terminated polymer. The action of this type of initiator is due to the fact that the azo carbon-nitrogen bond is readily dissociated, as by thermal means.

The preferred difunctional peroxide initiator has the formula

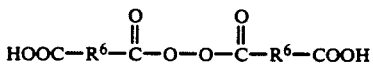

wherein $R^6$ is an alkyl group having from about 2 to about 6 carbon atoms, and preferably 3 carbon atoms. A desirable peroxide is succinic acid peroxide and a preferred peroxide is glutaric acid peroxide The difunctional peroxide initiator decomposes to form $CO_2$ gas and free radicals having the formula

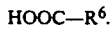

wherein $R^6$ is represented by X in the structural formula shown above for the monofunctional carboxyl-terminated precursor polymer. The action of this type of initiator is due to the fact that the peroxide oxygen-oxygen bond is readily dissociated, as by thermal means.

Considering the nonfunctional initiator, any nonfunctional azo or peroxide initiator can be used. Preferably the azo initiator is a bis-azocyano having the formula

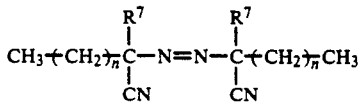

wherein $R^7$ is an alkyl group of 1–3 carbon atoms and n is an integer from 0 to 6. Such compounds are known and disclosed in U.S. Pat. No. 2,556,876. The preferred compound is 2,2'-azobis(2-methylpropionitrile) also known as AIBN. The azo initiator decomposes to form $N_2$ gas and free radicals having the formula

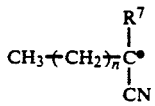

which is represented by —Y— as the non-reactive terminus of the precursor monofunctional carboxyl-terminated polymer described above. The action of this type of initiator also is due to the fact that the azo carbon-nitrogen bond is readily dissociated, as by thermal means.

The nonfunctional peroxide initiator preferably is an acyl peroxide having the formula

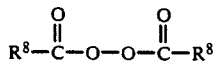

wherein $R^8$ is an aromatic, or an unsubstituted or a substituted alkyl group desirably having from about 1 to about 15 and preferably from about 1 to about 6 carbon atoms. Desirable peroxides include diacetyl peroxide, dilauryl peroxide, didecanoyl peroxide, and diisononanoyl peroxide, with dibenzoyl peroxide being preferred. The nonfunctional peroxide initiator decomposes to form $CO_2$ gas and free radicals having the formula $R^8$ which also is represented by Y as the non-reactive terminus of the precursor monofunctional carboxyl-terminated polymer described above. The action of this type of initiator is also due to the fact that the peroxide oxygen-oxygen bond is readily dissociated, as by thermal means.

The amount of initiators present, on a mole basis, may vary from about 0.2 percent to about 90 percent difunctional initiator and from about 10 percent to about 99.8 percent nonfunctional initiator. Preferably from about 30 percent to about 75 percent difunctional initiator is used in combination with from about 70 percent to about 25 percent nonfunctional initiator. Most preferred is from about 60 percent to about 40 percent difunctional initiator in combination with from about 40 percent to about 60 percent nonfunctional initiator. As noted, one skilled in the art will appreciate that the monofunctional polymer product is a blend or mixture of molecules having different end groups, namely a monofunctional species, a difunctional species and a nonfunctional species. When the ideal 50/50 blend of difunctional and nonfunctional initiators is used, it is expected that statistically one obtains, by weight, from about 5 percent to about 90 percent difunctional specie, from about 90 percent to about 5 percent nonfunctional specie, and about 5 percent to about 50 percent monofunctional specie; desirably from about 10 percent to about 50 percent difunctional specie, from about 10 percent to about 50 percent nonfunctional specie, and up to about 50 percent monofunctional specie; and preferably about 25 percent difunctional specie, about 25 percent nonfunctional specie and about 50 percent monofunctional specie When other ratios of difunctional and nonfunctional initiators are utilized, it will be appreciated that the end amount of the nonfunctional terminated polymer as well as the difunctional terminated polymer will generally vary in accordance with the ratio of the difunctional polymer to the nonfunctional polymer, but that the amount of the monofunctional specie will generally be no higher than 50 percent. However, as noted above, the blend or mixture of the statistical monofunctional carboxyl-terminated polymer desirably has an average functionality per polymer of approximately 1.

The liquid polymerization products can be prepared in any solvent for the initiators, the monomers or the polymers. The solvent is desirably low boiling so it can be readily removed. Such solvents are generally polar and do not act as chain transfer agents. Examples of such solvents include the various ketones having from 2 to about 10 carbon atoms, various alcohols having from 1 to about 7 carbon atoms, various aromatic compounds having from about 6 to about 10 carbon atoms, various esters of a carboxylic acid wherein the ester portion has up to about 4 carbon atoms and the dicarboxylic acid has from about 2 to about 3 or 4 carbon atoms in the non-ester portion, and various ethers including internal ethers having from about 3 to about 7 carbon atoms. Specific examples of suitable solvents include acetone, methyl ethyl ketone, 2-pentanone, 3-pentanone, methyl isobutyl ketone, methyl alcohol, ethyl alcohol, n-propyl alcohol, isopropyl alcohol, butyl alcohol, isobutyl alcohol, sec-butyl alcohol, tert-butyl alcohol, benzene, toluene, methyl acetate, ethyl acetate, propyl acetate, and tetrahydrofuran Acetone is preferred.

The reaction temperature may range from about 40° C. to about 120° C., desirably 60° C. to about 100° C., and preferably from about 70° C. to about 90° C. The number average molecular weight (Mn) of the precursor statistical monofunctional carboxyl-terminated polymers ranges from about 1,000 to about 12,000, based upon size exclusion chromatography method of determination.

Those skilled in the art will appreciate that in order to form a polymer having uniform composition throughout the charge and maintain constant molecular weight over the length of the polymerization, the initiator, and comonomer if copolymerizing, must be continuously metered throughout the polymerization. Therefore, the statistical monofunctional carboxyl-terminated polymers are made by a method whereby initially, the reactor is charged with monomer, and a small amount of initiator mixture and comonomer if copolymerizing, and all of the polymerization solvent. The exact amounts of monomers and initiator will vary depending upon the product polymer, however, the amounts can be readily determined experimentally by conventional methods of calculation. Then, after bringing the reaction mixture to reaction temperature, more initiator, and comonomer if copolymerizing, are added during polymerization such that they are continuously metered including incremental addition or a plurality of batch additions, etc. throughout polymerization. Conventional procedures including incremental addition or a plurality of batch additions can be used to recover the resulting reaction products.

No emulsifier is necessary for this process. After polymerization it may be desirable to add conventional additives to the polymer, depending upon its end use, such as thermal stabilizers, including Geltrol® commercially available from The BFGoodrich Company, Akron, Ohio, U.S.A.

The above-described process for forming the statistical monofunctional carboxyl-terminated polymer will be better understood by the following examples.

EXAMPLE 1

The statistical monofunctional carboxyl-terminated polymer was obtained in the following experiment. A 20 gallon reactor was cooled to 25° C. and evacuated to suck in 2.08 Kg acrylonitrile, 6.12 Kg acetone and 0.99 Kg initiator solution, in sequence. The initiator solution concentration was 10.3 percent ADVA and 6.03 percent AIBN. The reactor was evacuated until the acetone boiled (about 20–25"Hg), then pressured to 20 psi with nitrogen. This was repeated and the reactor once again evacuated to 20"Hg. The vacuum was broken by charging 38.0 lbs. of butadiene. The mixture was heated to reaction temperature of 85° C. and allowed to react for approximately 13 hours. During polymerization, additional initiator mixture and acrylonitrile were metered into the reaction vessel. Conventional techniques were used to recover the product which had an acid number of 12.9, viscosity at 27° C. of 65,000 mPa's and a bound acrylonitrile content of 16.5 percent.

EXAMPLE 2

The statistical monofunctional carboxyl-terminated polymer was obtained in the following experiment. A 15 gallon reactor was cooled to 25° C. and evacuated to suck in 3.52 Kg acrylonitrile, 5.58 Kg acetone and 2.72 Kg initiator solution, in sequence. The initiator solution concentration was 8.0 percent ADVA and 4.7 percent AIBN. The reactor was evacuated until the acetone boiled (about 20–25"Hg), then pressured to 20 psi with nitrogen. This was repeated and the reactor once again evacuated to 20"Hg. The vacuum was broken by charging 30.22 lbs. of butadiene. The mixture was heated to reaction temperature, 75° C. and allowed to react for approximately 26 hours. During polymerization, additional initiator mixture and acrylonitrile were metered into the reaction vessel. Conventional techniques were used to recover the product which had an acid number of 13 3, viscosity at 27° C. of 202,000 mPa's and a bound acrylonitrile content of 25.9 percent.

EXAMPLES 3–18

Physical property evaluations were conducted on polymer samples to compare the performance of the statistical monocarboxyl-terminated polymers to conventional dicarboxyl-terminated polymers in a model two-part epoxy system.

Monofunctional low viscosity statistical carboxyl-terminated polymers were prepared in accordance with the methods set forth in Examples 1 and 2 hereinabove. These were nitrile rubber monofunctional polymers having butadiene/acrylonitrile backbones. Polymer C contained 16 percent by weight acrylonitrile (Examples 3–6) and polymer D contained 26 percent by weight acrylonitrile (Examples 11–14). The corresponding difunctional carboxyl-terminated polymers, c (Examples 7–10) and d (Examples 15–18) contained the same amounts of acrylonitrile respectively.

The samples which were tested consisted of model two-part epoxy recipes, set forth below, whereby carboxyl-functional polymer cured with DGEBA (diglycidyl ether of bisphenol A) epoxy resin using piperidine as a catalyst. Mechanical property measurements were made by mixing the model epoxy recipes, and casting the mixtures into 8×10×0.25 inch (20×25×.635 cm) Teflon-coated aluminum molds. They were cured for one (1) hour at 120° C.. Tensile and Compact Tension specimens were machines from these 0.25 inch (.635 cm) plaques and tested according to ASTM D-638 and E-399 for mechanical and fracture toughness properties respectively. The results are set forth in Table II. Fracture toughness is represented by $K_{IC}$ and Fracture Energy, which is the energy necessary to propagate a crack through the material, is $G_{IC}$, while glass transition temperature is $T_g$.

The mechanical properties summarized in Table II show that all of the modified epoxy resins show some loss of tensile strength and modulus over that for the unmodified resin And these losses increase with the amount of modifying polymer. However, the elongation at break generally increases with increasing amount of polymer. Polymers d, C and D all show equal to or greater elongations than the control (Examples 3, 7, 11 and 15) recipe. Polymer c shows almost no increase in elongation with increasing levels of polymer. The glass transition, Tg, does not appear to change with increasing amount of polymer up to 15 phr. The most significant changes occur in the critical strain energy release rate, or fracture energy, $G_{IC}$ and the stress intensity factor $K_{IC}$. These quantities are related by the following equation for plane strain conditions:

$$G_{IC} = \frac{K_{IC}^2}{E}(1 - \nu^2)$$

where $\nu$ = Poisson's ratio, and E = Young's modulus

From this equation one can see that increases in fracture energy, $G_{IC}$, of a material require an increase in $K_{IC}$ with increasing amount of polymer so that any increases in $G_{IC}$ cannot be attributed to a large decrease in modulus. Polymers c, C and D are examples of two phase toughening and all show increases in fracture energy up to 10 phr of polymer. Polymer d with 26 percent acrylonitrile has a very small particle size second phase and thus shows only a very modest increase in $G_{IC}$. Polymer c shows the highest fracture energy at 15 phr.

TABLE II

Mechanical Properties of DGEBA Epoxy Resin, Cured Using Piperidine As Catalyst, Containing Statistical Carboxyl-Terminated Polymers

| | Monofunctional Polymer | | | |
|---|---|---|---|---|
| Example | 3 | 4 | 5 | 6 |
| Recipe | | | | |
| DGEBA Liquid Epoxy (828) | 100 | 100 | 100 | 100 |
| Polymer C | 0 | 5 | 10 | 15 |
| Piperidine | 5 | 5 | 5 | 5 |
| Tensile Strength, mPa | 59.1 | 51.0 | 47.2 | 45.2 |
| Elongation % | 7.96 | 7.44 | 10.4 | 14.6 |
| Modulus, GPa | 2.75 | 2.58 | 2.25 | 2.09 |
| $K_{Ic}$, MN/m3/2 | 0.764 | 1.83 | 2.4 | 2.26 |
| $G_{Ic}$, KJ/m2 | 0.188 | 1.15 | 2.26 | 2.17 |
| Tg, °C | 90 | 89 | 90 | 90 |

| | Difunctional Polymer | | | |
|---|---|---|---|---|
| Example | 7 | 8 | 9 | 10 |
| Recipe | | | | |
| DGEBA Liquid Epoxy (828) | 100 | 100 | 100 | 100 |
| Polymer c | 0 | 5 | 10 | 15 |
| Piperidine | 5 | 5 | 5 | 5 |
| Tensile Strength, mPa | 59.1 | 52.1 | 47.3 | 42.8 |
| Elongation % | 7.96 | 5.2 | 5.2 | 7.4 |
| Modulus, GPA | 2.75 | 2.49 | 2.22 | 1.91 |
| $K_{Ic}$, MN/m3/2 | 0.764 | 2.03 | 2.54 | 2.66 |
| $G_{Ic}$, KJ/m2 | 0.188 | 1.47 | 2.56 | 3.29 |
| Tg, °C | 90 | 90 | 89 | 88 |

| | Monofunctional Polymer | | | |
|---|---|---|---|---|
| Example | 11 | 12 | 13 | 14 |
| Recipe | | | | |
| DGEBA Liquid Epoxy (828) | 100 | 100 | 100 | 100 |
| Polymer D | 0 | 5 | 10 | 15 |
| Piperidine | 5 | 5 | 5 | 5 |
| Tensile Strength, mPa | 59.1 | 54.5 | 48.6 | 44.3 |
| Elongation % | 7.96 | 8.35 | 9.57 | 12.9 |
| Modulus, GPa | 2.75 | 2.12 | 1.89 | 1.67 |
| $K_{Ic}$, MN/m3/2 | 0.764 | 1.96 | 2.34 | 2.12 |
| $G_{Ic}$, KJ/m2 | 0.188 | 1.60 | 2.56 | 2.37 |
| Tg, °C | 90 | 88 | 88 | 87 |

| | Difunctional Polymer | | | |
|---|---|---|---|---|
| Example | 15 | 16 | 17 | 18 |
| Recipe | | | | |
| DGEBA Liquid Epoxy (828) | 100 | 100 | 100 | 100 |
| Polymer d | 0 | 5 | 10 | 15 |
| Piperidine | 5 | 5 | 5 | 5 |
| Tensile Strength, mPa | 59.1 | 57.9 | 47.1 | 43.9 |
| Elongation % | 7.96 | 9.19 | 11.3 | 16.7 |
| Modulus, GPA | 2.75 | 2.70 | 2.40 | 2.38 |
| $K_{Ic}$, MN/m3/2 | 0.764 | 1.45 | 1.55 | 1.84 |
| $G_{Ic}$, KJ/m2 | 0.188 | 0.69 | 0.88 | 1.3 |
| Tg, °C | 90 | 90 | 90 | 88 |

A graphic summary of the comparative fracture energy ($G_{IC}$) values in Examples 3-18 is presented in FIG. 1. The fracture energy, or the amount of energy necessary to propagate a crack through the material, is expressed in units of kilojoules per meter squared (KJ/m2) on the Y-axis versus the amount of polymer expressed in units of parts per hundred of resin (PHR) on the X-axis For epoxy recipes containing up to 10 parts polymer, both low viscosity monofunctional polymers C and D behave like the difunctional polymer c containing 16 percent acrylonitrile. The polymers C and D demonstrated a performance superior to the difunctional polymer d containing 26 percent acrylonitrile.

In accordance with the statistical monofunctional amine-terminated reactive liquid polymer embodiment of the present invention, the precursor monofunctional carboxyl-terminated polymer, as noted, is actually a blend or mixture of statistical monofunctional carboxyl-terminated polymers, the structure, formation and properties of which have been described in detail above and is hereby fully incorporated by reference, is reacted with a polyamine compound. Thus, the formed amine-terminated reactive liquid rubber polymer is also a statistical blend of difunctional amine-terminated polymers, monofunctional amine-terminated polymers, as well as nonfunctional polymers. The actual monofunctional amine-terminated reactive liquid rubber polymer can be generally represented by the structural formula

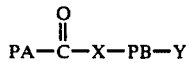

wherein X, Y, and PB are as set forth hereinabove and wherein PA is a polyamine compound. Naturally, it is to be understood that the polyamine/carboxylic acid salt initially formed will liberate water to form an amide during the condensation reaction. The difunctional amine-terminated reactive liquid rubber polymer can generally be represented by the structural formula

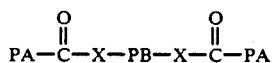

where PA and X are as described hereinabove. The actual nonfunctional terminated polymer will have the general structural formula Y—PB—Y where Y is as described hereinabove.

Generally, any reacted polyamine compound represented by PA in the above formula, that is a compound containing two or more amine groups therein, can be utilized to react with the precursor monofunctional carboxyl-terminated polymer, so long as the amine groups are primary or secondary, that is $R'NH_2$ or $R''NHR'''$, respectively, where $R'$, $R''$ and $R'''$ are hydrocarbon groups. Tertiary amines cannot be used because they will not react with the carboxylic acid group of the precursor polymer. The above formulation will thus contain an internal amide group formed by the reaction of one of the amine groups with the carboxyl group.

More specifically, the polyfunctional amines or the polyamine compounds which are suitable for use in the present invention generally can be represented by the formula

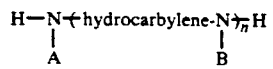

-continued
(POLYFUNCTIONAL AMINE FORMULA #1)

where the hydrocarbylene portion has from about 2 to about 20 carbon atoms. The number repeating units, that is n, is an integer of from about 1 to about 10, and preferably from about 1 to about 4. Thus, the polyamine can be an oligomer. A or B, independently, can be substantially hydrocarbon or hydrogen. Desirably, A or B, independently, are hydrogen or an alkyl having from 1 to about 30 carbon atoms, with from about 1 to about 8 carbon atoms being desirable. The hydrocarbylene group can generally be an aliphatic having from about 2 to about 20 carbon atoms and preferably from about 2 to about 12 carbon atoms. A desirable hydrocarbylene is an alkylene having from about 2 to about 20 carbon atoms with from about 2 to about 12 carbon atoms being preferred such as butanediamine, pentanediamine, hexane diamine, and the like. Another suitable hydrocarbylene is a cycloalkylene having from about 4 to about 20 carbon atoms with from about 4 to about 12 carbon atoms being preferred. Various hydrocarbylene aromatic compounds include phenylene, naphthalene and the like having from about 6 to about 20 carbon atoms with from about 6 to about 10 carbon atoms being preferred. Additionally, aromatic substituted alkyl or alkyl substituted aromatic groups can be utilized having from about 2 to about 10 carbon atoms with from about 5 to about 7 carbon atoms being preferred. Specific examples of suitable polyamines include the ethyleneamine family, that is ethylenediamine (EDA), diethylenetriamine (DETA), triethylenetetramine (TETA), tetraethylenepentamine (TEPA), and pentaethylenehexamine (PEHA). The propyleneamine family of products comprises 1,2-propanediamine (1,2-pDA), 1,3-propanediamine (1,3—PDA), iminobispropylamine (IBPA), dimethylaminopropylamine (DMAPA) and the like. Examples of other alkyleneamines include cyclic and the higher homologues of such amines such as amino substituted terpenes and amino-alkyl-substituted piperazines. They are exemplified specifically by: propylenediamine, decamethylenediamine, octa-methylenediamine,2-methyl-pentanediamine,di(heptamethylene)triamine, tripropylenetetramine, trimethylenediamine, 1,3-bis(2-aminoethyl)imidazoline, 1,4-bis(2-aminoethyl)piperazine, and 1-(2-aminoethyl)piperazine (i.e., AEP). Higher homologues such as are obtained by condensing two or more of the above-illustrated alkylene amines likewise are useful. Examples of cycloalkylene amines include 1,2-diaminocyclohexane,1,3-cyclohexanebis(methylamine), isophoronediamine, menthanediamine (MDA), 4,4'-methylenebis(cyclohexylamine). Examples of aromatic polyamines include p-phenylenediamine (PPDA), m-phenylenediamine, 2,4-diaminotoluene, ethylenedianiline, 1,5-diaminonaphthalene, 1,8-diaminonaphthalene, methylenedianiline, and the like. Examples of highly preferred polyamines include EDA, DETA, TETA, TEPA, PEHA, methyl-pentanediamine, isophoronediamine, MDA, hexamethylenediamine, and iminobispropylamine, with AEP being highly preferred.

In addition, various amine-terminated polyethers, which are represented by the formula

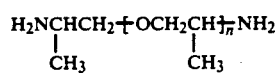

(POLYFUNCTION AMINE FORMULA #2)

can be utilized where n is an integer from about 2 to about 100, desirably from about 2 to about 70 and preferably from about 2 to about 5, and wherein each "Alkylene", independently, has from about 2 to about 10 carbon atoms with 2 carbon atoms, that is ethylene, or 3 carbon atoms, that is propylene, being preferred. The "Alkylene" group can be branched or straight. Specific examples of such amine terminated polyethers include the Jeffamine D-Series produced by the Texaco Chemical Co. and have the formula $$\text{H}_2\text{NCHCH}_2\text{+OCH}_2\text{CH}\text{+}_{\overline{n}}\text{NH}_2$$
$$\hspace{1em}|\hspace{4em}|$$
$$\text{CH}_3\hspace{3em}\text{CH}_3$$

(POLYFUNCTIONAL AMINE FORMULA #3)

where n is an integer of from about 2 to about 100.

The various types of available Jeffamine D-Series products where n is an integer of from about 2 to about 100, include the following

| Product | n | Approx. Mol. Wt. |
|---|---|---|
| Jeffamine D-230 | 2–3 | 230 |
| Jeffamine D-400 | 5–6 | 400 |
| Jeffamine D-2000 | 33 | 2000 |
| Jeffamine D-4000 | 68 | 4000 |

Other types of amine terminated polyethers suitable for use in the present invention are represented by the formula

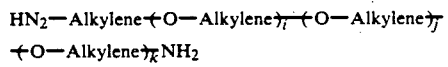

(POLYFUNCTIONAL AMINE FORMULA #4)

wherein each "Alkylene", independently, is set forth above, and wherein i plus k is an integer of from about 2 to about 25, desirably from about 2 to about 10 and preferably from about 2 to about 5. The number of repeating units represented by j is an integer of from about 1 to about 200, desirably from about 2 to about 150 and preferably from about 2 to about 10. Examples of such suitable polyethers include the Jeffamine ED-Series produced by the Texaco Chemical Co. and have the formula

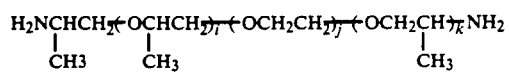

(POLYFUNCTIONAL AMINE FORMULA #5)

Examples of such specific Jeffamine ED-Series polymers include the following:

| Product | j | i + k | Approx. Mol. Wt. |
|---|---|---|---|
| Jeffamine ED-6008 | 8.5 | 2.5 | 600 |
| Jeffamine ED-900 | 15.5 | 2.5 | 900 |
| Jeffamine ED-2001 | 40.5 | 2.5 | 2,000 |

| Product | j | i + k | Approx. Mol. Wt. |
|---|---|---|---|
| Jeffamine ED-4000 | 86.0 | 2.5 | 4,000 |
| Jeffamine ED-6000 | 31.5 | 2.5 | 6,000 |

Still another type of suitable amine terminated polyethers which can be utilized in the present invention are those generally represented by the formula

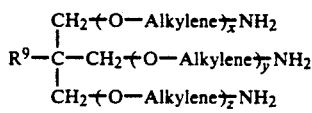

(POLYFUNCTIONAL AMINE FORMULA #6)

wherein each "Alkylene," independently, is as set forth above, that is, has from about 2 to about 10 carbon atoms therein with 2 or 3 carbon atoms being preferred. The total number of x+y+z integers is from about 2 to about 100, desirably from about 2 to about 10 and preferably from about 5 to about 10. $R^9$ is hydrogen or an aliphatic group with a desirable aliphatic group being an alkyl. When $R^9$ is an alkyl it has from about 1 to about 5 carbon atoms with 1 or 2 carbon atoms being preferred. Examples of such suitable polyethers include the Jeffamine T-Series produced by the Texaco Chemical Company and have the formula

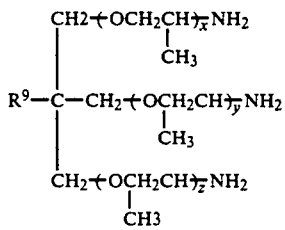

(POLYFUNCTIONAL AMINE FORMULA #7)

Examples of such specific Jeffamine T-Series include the following:

| Product | Approx. Value x + y + z | Approx. Mol. Wt. |
|---|---|---|
| Jeffamine T-403 | 5–6 | 440 |
| Jeffamine T-3000 | 50 | 3000 |
| Jeffamine T-5000 | 85 | 5000 |

In accordance with one of the main features of the present invention, the amount of the polyamine which is utilized on an equivalent weight basis with respect to the base statistical carboxyl-terminated polymer, is generally kept low. Larger amounts of the polyamine can be utilized, though such amounts tend to result in excess amine which acts as a co-cure agent and causes premature cure of the epoxy resin systems with which the statistical monofunctional amine-terminated reactive liquid polymers are used. Low polyamine amounts thus are highly desirable inasmuch as it produces a low viscosity statistical monofunctional amine-terminated compound such as a nitrile rubber, without too high an cess of polyamine which can cause premature cure of the epoxy resin systems. Such low amounts are on a mole basis of the polyamine to the statistical carboxyl-terminated monofunctional polymer is generally from about 1.0 to 5.0 moles, desirably from about 1.0 to 2.0, with from about 1.00 to about 1.30 moles being preferred.

The statistical monofunctional amine-terminated polymer is derived from the statistical monofunctional carboxyl-terminated polymer in the following manner. The polyamine is combined with the base monofunctional carboxyl-terminated polymer in an inert atmosphere such as nitrogen or argon at temperatures of from about 120° C. to about 200° C., and preferably from about 140° C. to about 160° C.. A condensation reaction takes place, and the purge is continuous with water being removed thereby. More specifically, the polyamine reacts with the carboxyl group(s) of the statistical monofunctional carboxyl-terminated polymers, thereby forming an amide group, and terminates the same with at least one amine end group. The statistical amine-terminated reactive liquid rubber polymer perhaps contains from about 5 percent to about 90 percent of the difunctional specie, from about 90 percent to about 5 percent of the nonfunctional specie, and about 5 percent to about 50 percent of the monofunctional specie; desirably from about 10 to about 50 percent of the difunctional specie, from about 10 to about 50 percent of the nonfunctional specie, and up to about 50 percent of the monofunctional specie; and preferably about 25 percent of the difunctional specie, about 25 percent of the nonfunctional specie, and about 50 percent of the monofunctional specie. The above ratios are generally with respect to utilizing an initial blend in forming the carboxyl-terminated species with approximately 50 mole percent of a difunctional initiator and 50 mole percent of a nonfunctional initiator. Thus, when the amounts of the difunctional initiator and the nonfunctional initiators are varied, the above ratios will vary, but it is to be understood that generally the amount of the monofunctional species, including the amine-terminated monofunctional specie, can vary generally up to 50 percent by weight and cannot be any higher.

It will be appreciated by one skilled in the art that the viscosity of the statistical amine-terminated reactive liquid rubber polymers, that is the composition polymer, will vary depending upon the monomeric composition of the polymeric backbone PB of the precursor statistical monofunctional carboxyl-terminated polymer, and in particular the acrylonitrile content of the precursor polymer when the polymer is a nitrile rubber, that is, a copolymer of butadiene and acrylonitrile. As described above with regard to the precursor polymer, the acrylonitrile content preferably is 16 percent. In any event, the viscosity is up to about 500,000 mPa's and desirably up to about 400,000 mPa's.

The greatest advantage provided by these polymers is that their viscosity is approximately at least ½ the value of an equivalent commercially known difunctional amine terminated polymer, enabling use of more of the desired co-cure agent. This is demonstrated by the measured viscosities summarized in the following Table III, which compares the viscosity of the inventive monofunctional versus difunctional amine-terminated polymers having the same compositions of butadiene homopolymers or butadiene/acrylonitrile copolymers.

TABLE III

| Carboxyl-Terminated Reactive Liquid Polymer | Polyamine | Ratio of Polyamine To Carboxyl Group | Visc. @ 27° C. (mPa's) | Amine Equivalent Weight and/or Free Amine |
|---|---|---|---|---|
| Difunctional | Aminoethylpiperazine | 1.9 | 200,000 | 1,000/5.2% |
| Difunctional | Aminoethylpiperazine | 1.2 | 528,000 | 1,600/1.2% |
| Statistical Monofunctional | Aminoethylpiperazine | 1.2 | 110,000 | 3,300/0.6% |
| Difunctional | 2-Methylpentamethylene diamine | 3.0 | 100,000 | 480/9.9% |
| Statistical Monofunctional | 2-Methylpentamethylene diamine | 1.3 | 220,000 | 3,200/0.8% |
| Difunctional | Hexanediamine | 1.3 | >2,000,000 | —/1.6% |
| Statistical Monofunctional | Hexanediamine | 1.3 | 360,000 | 5,800/0.8% |

As discussed earlier hereinabove, the significantly lowered viscosity as illustrated in Table III attaches substantial advantages over known difunctional amine-terminated polymers. More particularly, the viscous difunctional amine polymers typically require warming to reduce their viscosity and render them more workable, especially in the field. The present inventive low viscosity statistical monofunctional amine-terminated polymers do not require warming prior to use and will be preferred for applications which must be performed at relatively lower ambient temperatures. Additionally, these polymers provide faster air release and better mixing. Therefore, these polymers will be preferred for applications involving mixing, which tends to entrap air, which must then be released before continuing, such as with on-site structural repair jobs.

As further illustrated in Table III, the statistical monofunctional amine-terminated reactive liquid polymers of the present invention have higher amine equivalent weights than do corresponding difunctional amine-terminated polymers, which results in lower amounts of unreacted or excess polyamine. Such reduced amounts of unreacted polyamine reduces the co-curing action of the excess polyamine on the epoxy resin systems with which the statistical monofunctional amine-terminated polymers are used, thereby allowing greater latitude in the choice of a primary amine cure agent. In general, the statistical monofunctional amine-terminated polymers of the present invention have an unreacted or free amine content of from about 0.01 percent to about 15 percent by weight, and preferably from about 0.1 percent to about 2 percent by weight based upon the total weight of the polymer. These polymers have a number average molecular weight of from about 1,000 to about 13,000.

The present low viscosity monofunctional polymers are generally liquid although they may be solid and are useful as toughening and/or flexibilizing agents for any epoxy resin systems. Epoxy resin systems include, but are not limited to, sealants, caulks, and adhesives. Specific system applications include those at ambient temperatures as well as those rich in resin and those rich in rubber. Resin rich system applications include one and two part adhesives, especially adhesives made of thermoset resins such as epoxy, for uses including structural adhesives in the marine, automotive and aircraft industries; electrical and electronic potting compounds and encapsulants; cast pipe; sheet molding compound other than epoxy; and bulk molding compound. Castable rubber rich system applications include construction and civil engineering applications including roofing, flooring, water-impermeable membranes, and crack sealers.

The invention will be better understood by the following examples.

EXAMPLE 19

About 400 grams of statistical monofunctional carboxyl-terminated reactive liquid polymer C was mixed with 13.1 grams of hexanediamine in a two-liter, three-neck flask. The mole ratio of diamine to statistical monofunctional carboxyl-terminated polymer was approximately 1.3. The reactor was equipped with a mechanical stirrer and a Dean and Stark tube surmounted by a reflux condenser. A slight nitrogen purge was maintained on the system to remove water as the reaction progressed. The temperature was raised to 140° C. and the reaction was monitored by titration to measure the disappearance of carboxylic acid. The reaction was complete after five hours at which time a vacuum was applied to remove any residual water. The final statistical amine-terminated reactive liquid polymer had a viscosity of 361,000 mPa's at 27° C. and an Amine Equivalent Weight of 5802 (Hydrogen Equivalent Weight=2901).

EXAMPLE 20

Following a procedure similar to that outlined above in Example 19, 609 grams of a monofunctional carboxyl-terminated polymer C was reacted with 21.1 grams of 2-methylpentamethylene diamine. The ratio of diamine to monofunctional carboxyl-terminated polymer was approximately 1.3. The reaction required five hours at 150° C. The final statistical amine-terminated reactive liquid polymer had a viscosity of 197,000 mpa's at 27° C. and an Amine Equivalent Weight of 2924 (Hydrogen Equivalent Weight=1462).

EXAMPLE 21

Following a procedure similar to that outlined above in Example 19, 1057 grams of a monofunctional carboxyl-terminated polymer C was reacted with 38.7 grams of aminoethylpiperazine. The ratio of diamine to monofunctional carboxyl-terminated polymer was approximately 1.2 The reaction required three hours at 140° C. The final statistical amine-terminated reactive liquid polymer had a viscosity of 109,000 mPa's at 27° C. and an Amine Equivalent Weight of 3341 (Hydrogen Equivalent Weight≈3,000).

In accordance with the statistical monofunctional epoxy-terminated reactive liquid polymer embodiment of the present invention, the precursor statistical monofunctional carboxyl-terminated polymer is once again utilized. The preparation, structure, formulation, and the like of the statistical carboxyl-terminated prepolymer is set forth hereinabove and accordingly is fully incorporated by reference with regard to the structure, formulation, and preparation thereof. Inasmuch as the statistical epoxy-terminated polymer composition is prepared by reacting one or more epoxy resins as set forth hereinbelow with a statistical monofunctional carboxyl-terminated polymer composition, the actual composition will contain various monofunctional epoxy-terminated polymers which can be represented by the general structural formula

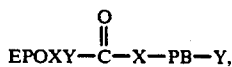

various difunctional polymers which can be represented by the general structural formula

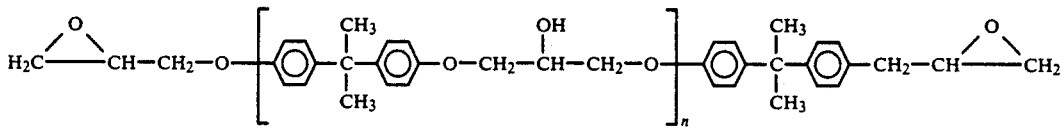

and various non-functional polymers which can be represented by the general structural formula Y—PB—Y, wherein X, PB, and Y are as set forth hereinabove, and wherein EPOXY is an epoxy resin which is reacted with the statistical monofunctional carboxyl-terminated polymer composition. Naturally, it is to be understood that during reaction with the statistical monofunctional carboxyl-terminated composition, ring opening reaction takes place. The reaction between the epoxy resin and the statistical monofunctional carboxyl-terminated polymer composition which will be described in more detail hereinbelow generally takes place in the presence of an inert atmosphere at elevated temperatures utilizing small amounts of catalysts.

Considering the "EPOXY" group, it is generally an epoxy resin usually known to the art and to the literature and can be various commercially available epoxy resins. Examples of specific epoxy resins or polymers which can be utilized in the present invention include: polyhydric phenol polyether alcohols; glycidyl ethers of novolac resins such as epoxylated phenolformaldehyde novolac resin; glycidyl ethers of mono-, di-, and trihydric phenols; glycidyl ethers of bisphenols such as diglycidyl ether of tetrabromobisphenol A; glycidyl ethers of polynuclear phenols; epoxy resin made from diphenolic acid; glycidyl ethers of aliphatic polyols such as chlorine-containing aliphatic diepoxy and polyepichlorohydrin; glycidyl esters such as aliphatic diacid glycidyl esters and epoxidized phenolphthalein; glycidyl epoxies containing nitrogen such as glycidyl amides and amide-containing epoxies; glycidyl derivatives of cyanuric acid; glycidyl resins from melamines; glycidyl amines such as triglycidyl ether amine of p-aminophenol and bis(2,3-epoxy-propyl)methylpropylammonium p-toluenesulfonate; glycidyl triazines; thioglycidyl resins such as epoxidized bisulfide; siliconglycidyl resins such as 1,4-bis[(2,3-epoxypropoxy)dimethylsilyl]; and fluorine glycidyl resins. Other epoxy resins which can be used include those which are synthesized from mono-epoxies ther than epihalohydrins including epoxy resins m from unsaturated monoepoxies such as polyallyl glycidyl ether and glycidyl sorbate dimer; epoxy resins from monoepoxy alcohols; epoxy resins from monoepoxies by ester interchange; epoxy resins from glycidaldehyde; polyglycidyl compounds containing unsaturation such as allyl-substituted diglycidyl ether of bisphenol A; epoxy resins which are synthesized from olefins and chloroacetyls such as butadiene dioxide, vinylcyclohexene dioxide, epoxidized polybutadiene, and bis(2,3-epoxycyclopentyl)ether, and epoxy-resin adducts of the above. A more comprehensive list of epoxy resins can be found in *Handbook of Epoxy Resins*, by Henry Lee and Kris Neville, McGraw-Hill, Inc., 1967, which is hereby incorporated by reference.

A highly preferred epoxy resin for use in the present invention is diglycidyl ether of bisphenol A (DGEBA) which has the following formula:

wherein n is an integer from 0 to 18, desirably from 0 to 14.3, and preferably from 0 to 5.5.

The various epoxy resins or polymers generally have a number average molecular weight of from about 200 to about 13,000. The various epoxy polymers generally are difunctional, that is, they have two epoxide groups typically at the terminal portions thereof. The amount of the epoxy resin to the statistical carboxyl-terminated monofunctional polymer is generally in excess, as from about 0.90 to about 40, desirably from about 0.90 to about 20, and preferably from about 0.95 to about 1.05. Thus, free epoxy resins will generally exist within the reacted statistical monofunctional epoxy-terminated reactive liquid rubber polymeric compositions.

Reaction of the various epoxy resins or polymers with the statistical carboxyl-terminated reactive polymers generally occurs at elevated temperature in the presence of an inert atmosphere. Generally, any inert gas can be utilized such as nitrogen, argon, and the like. The reaction generally occurs at temperatures of from about 80° C. to about 180° C., desirably from about 90° C. to about 140° C., and preferably from about 90° C. to about 120° C., generally in the presence of ambient or normal atmospheric temperature. In order to promote reaction, conventional epoxy catalysts are optionally utilized.

One group of catalyst which can be utilized are the various organic phosphines having from 3 to 40 carbon atoms which include various alkyl, various aromatic, various alkyl substituted aromatic, etc., phosphines such as triphenyl phosphine, diethylphenylphosphine, dimethylphenylphosphine, tribenzylphosphine, tri-n-butylphosphine, tri-t-butylphosphine, tricyclohexylphosphine, triethylphosphine, trimethylphosphine, tri-n-octylphosphine, triphenylphosphine, tris(3-chlorophenyl)phosphine, tris(4-chlorophenyl)phosphine, tris(4-fluorophenyl)phosphine, tris(2-hydroxyphenyl)phosphine, tris(3-methoxyphenyl)phosphine, tris(4-methoxyphenyl)phosphine, tris(2-tolyl)phosphine, and tris(3-tolyl)phosphine. A second type of catalyst are the various tertiary amines wherein the hydrocarbyl portion is generally an aliphatic and preferably an alkyl group, an aromatic group, or an aliphatic substituted aromatic, or an aromatic substituted aliphatic group, having a total of from about 1 to about 10 carbon atoms with from about 1 to about 6 carbon atoms being preferred. Examples of specific tertiary amine catalysts include benzyl dimethyl amine, trimethyl amine, triethylamine, and the like. Another group of suitable catalysts are the various alkyltriphenylphosphonium ester or halide salts wherein the alkyl group generally has from 1 to about 10 carbon atoms, and wherein iodide is the preferred halide salt. Examples of such specific catalysts include ethyltriphenylphosphonium acetate, ethyltriphenylphosphonium iodide, n-hexyltriphenylphosphonium bromide, isobutyltriphenylphosphonium bromide, isopropyltriphenylphosphonium bromide.

As noted, although generally desired, the catalysts are optional and hence may not be utilized. When utilized, the amount thereof is generally up to about 1 percent by weight based upon a total weight of the epoxy resin and the statistical monofunctional carboxyl-terminated reactive polymer, desirably up to about 0.5 percent by weight, and preferably from about 0.001 to about 0.1 percent by weight.

In order to reduce the level of residual reactions, the formed monofunctional epoxy-terminated reactive polymers of the present invention desirably have a low acid number, such as 2.0 or less, and preferably 0.4 or less. Moreover, the epoxy-terminated reactive polymers also have very low viscosities, such as generally less than 2,000,000 mPa's, desirably 1,000,000 mPa's or less, and preferably 500,000 mPa's or less.

Inasmuch as the epoxy resins react with available carboxyl-terminated functional end groups, the overall make-up or content of the statistical epoxy-terminated reactive liquid rubber polymers will generally contain the same ratios or amounts of reactive epoxy-terminated end groups as the statistical carboxyl-terminated polymers. Thus, if the statistical carboxyl-terminated polymers are made utilizing approximately 50 percent of a difunctional initiator and 50 percent of a nonfunctional initiator, the statistical epoxy-terminated polymers will contain generally from about 5 percent to about 90 percent of the difunctional specie, from about 90 to about 5 percent of the difunctional specie, and from about 5 percent to about 50 percent of the monofunctional specie; desirably from about 10 to about 50 percent of the difunctional specie, from about 10 to about 50 percent of the nonfunctional specie, and up to about 50 percent of the monofunctional specie; and preferably about 25 percent of the difunctional specie, about 25 percent of the nonfunctional specie, and about 50 percent of the monofunctional specie Hence, as noted above, it is termed a statistical epoxy-terminated monofunctional reactive liquid rubber polymer composition. The ratios of the various species of the statistical polymer will vary depending upon the amount of initiators generally utilized and hence the amount of the difunctional or nonfunctional species can vary widely with the amount of the monofunctional specie can generally not be greater than 50 percent.

The statistical epoxy-terminated monofunctional polymers of the present invention are generally liquid but can also be solid and have significantly lower viscosities than heretofore conventional but difunctional epoxy-terminated polymers, which render them more workable, especially in the field. Suitable applications include ambient temperature use as well as use in association with epoxy resins and structural adhesives in the marine, automotive, and aircraft industries; electrical and electronic prodding compounds and encapsulants; cast pipe; sheet molding compounds, boat molding compounds, and the like. They can also be utilized as castable systems in construction and civil engineering applications such as roofing, flooring, water-impermeable membranes, cracks sealers, and the like.

The invention will be better understood by reference to the following examples.

EXAMPLE 22

To a suitably sized reaction vessel was charged 400 grams of polymer C and 34.7 grams of Epon 828, that is, DGEBA, at a molar ratio of approximately 1:1. 0.05 grams of triphenyl phosphine was added as a catalyst. In the presence of a nitrogen blanket, the temperature of the reaction vessel was raised to approximately 130° C. and the reaction continued until the acid number was generally less than 0.6. The reaction time was approximately 20 hours to reach completion. The statistical epoxy-terminated reactive polymer had a viscosity of 339,000 mPa's at 27° C. In contrast, a similar reaction utilizing a difunctional carboxyl-terminated reactive polymer yielded a viscosity in excess of 2,000,000.

EXAMPLE 23

An epoxy-terminated reactive polymer was made utilizing the same procedure as in Example 1 except that Polymer D and 600 grams of Epon 828 was utilized. The molar ratio was thus approximately 17.3. No catalyst was utilized and the reaction was completed in about 4.5 hours. The statistical epoxy-terminated reactive polymer had a viscosity of 91,000 mPa's at 27° C. In contrast, a control utilizing the same reactants and amounts except that a difunctional carboxyl-terminated reactive polymer was utilized, yielded a product having a viscosity of from about 300,000 to about 600,000 mPa's at 25° C.

EXAMPLE 24

In a suitably sized reaction vessel was added equal parts by weight of polymer D and the diglycidyl ether of cyclohexane dimethanol. Under a blanket of nitrogen, the reaction temperature was raised to 130° C. and reacted until the Acid No. was <0.6. The reaction required 4.5 hours to reach completion. The final product had a viscosity of 8600 mPa's at 27° C. (The same reaction with a standard difunctional RLP gives an adduct with a viscosity of 15,000–25,000 mPa's at 25° C.) Molar Ratio RLP/Epoxy—1:8.6

EXAMPLE 25

In a suitably sized reaction vessel was added 200 parts by weight of polymer D and 300 parts of an epoxy novolac (such as DEN-438). Under a blanket of nitrogen was added 2.5 grams (0.5 weight percent) of phosphonium iodide and the reaction temperature was raised to 100° C. The reaction required only 1 hour to reach the desired end point of no titratable acid. The final adduct had a viscosity of 160,000 mPa's at 50° C. and 1,980,000 mpa's at 27° C. (There is no comparable adduct with a difunctional RLP).

While in accordance with the Patent Statutes, the best mode and preferred embodiment has been set forth, the scope of the invention is not limited thereto, but rather by the scope of the attached claims

What is claimed is:

1. A low viscosity monofunctional product, comprising:
   a blend of statistical monofunctional carboxyl-terminated reactive liquid polymers (RLP) having a backbone of carbon-carbon linkages derived from free radical polymerization of monomers, said blend containing difunctional carboxyl-terminated RLP, monofunctional carboxyl-terminated RLP, and nonfunctional terminated RLP, said free radical polymerization being accomplished by utilizing a mixture of a first initiator fragment having a reactive carboxyl end group and a second initiator fragment having a non-reactive end group.

2. The polymer of claim 1, wherein said monomers are ones comprising at least one vinyl monomer having at least one terminal vinyl group.

3. The polymer of claim 2, wherein said vinyl monomer is a diene containing 4 to 10 carbon atoms, a vinyl ester of carboxylic acid containing 2 to 8 carbon atoms, an allyl ester of carboxylic acid containing 2 to 8 carbon atoms, a vinyl ether of alkyl radicals containing 1 to 8 carbon atoms, an allyl ether of alkyl radicals containing 1 to 8 carbon atoms, or an acrylate having the following general structural formula

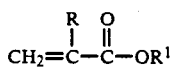

wherein R is hydrogen or an alkyl radical containing 1 to 3 carbon atoms, and $R^1$ is an alkyl radical containing 1 to 8 carbon atoms, or an alkoxyalkyl, or an alkylthioalkyl, or a cyanoalkyl having from 2 to 12 carbon atoms.

4. The polymer of claim 3, wherein said vinyl monomer is isoprene, butadiene, 2-isopropyl-1,3-butadiene, chloroprene, vinyl acetate, vinyl propionate, allyl acetate, vinyl methyl ether, allyl methyl ether, ethyl acrylate, butyl acrylate, hexyl acrylate, 2-ethylhexyl acrylate, dodecyl acrylate, octadecyl acrylate, methoxyethyl acrylate, butoxyethyl acrylate, hexylthioethyl acrylate, α-cyanoethyl acrylate, cyanooctyl acrylate, methyl methacrylate, ethyl methacrylate, or octylmethacrylate.

5. The polymer of claim 4, wherein said vinyl monomer is butadiene.

6. The polymer of claim 2, wherein said vinyl monomer is copolymerized with up to about 50 percent by weight of at least one comonomer selected from the group consisting of vinyl aromatics, vinyl nitriles, vinyl halides, vinyl acids, amides of olefinically unsaturated carboxylic acids, allyl alcohols, and combinations thereof.

7. The polymer of claim 4, wherein said vinyl monomer is copolymerized with up to about 35 percent by weight of at least one comonomer selected from the group consisting of styrene, α-methyl styrene, chlorostyrene, vinyl toluene, methacrylonitrile, vinyl bromide, vinyl chloride, acrylic acid, methacrylic acid, itaconic acid, acrylamide, methacrylamide, and allyl alcohol.

8. The polymer of claim 2, wherein said vinyl monomer is copolymerized with acrylonitrile.

9. The polymer of claim 5, wherein said vinyl monomer is copolymerized with acrylonitrile.

10. The polymer of claim 8, wherein the polymer comprises from about 10 percent to about 35 percent by weight of acrylonitrile.

11. The polymer of claim 9, wherein the polymer comprises from about 10 percent to about 26 percent by weight of acrylonitrile.

12. The polymer of claim 5, wherein the polymer comprises about 16 percent by weight of acrylonitrile.

13. The polymer of claim 9, wherein the polymer comprises about 16 percent by weight of acrylonitrile.

14. The polymer of claim 1, wherein said first initiator fragment is a difunctional organic azo compound or a peroxide; and wherein said second initiator fragment is a nonfunctional azo compound or a peroxide.

15. The polymer of claim 13, wherein said first initiator fragment is a difunctional organic azo compound or a peroxide; and wherein said second initiator fragment is a nonfunctional azo compound or a peroxide.

16. The polymer of claim 1, wherein said first initiator fragment is a bis-azocyano acid having the general structural formula:

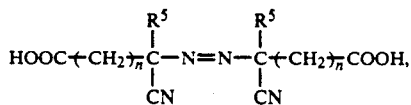

wherein $R^5$ is an alkyl having from 1 to 3 carbon atoms, and wherein n is a integer of from 1 to 6, or a peroxide having the general structural formula:

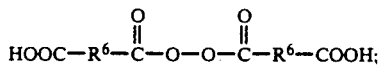

wherein $R^6$ is an alkyl having from 2 to 6 carbon atoms, and wherein said second initiator fragment is a bis-azocyano represented by the general structural formula:

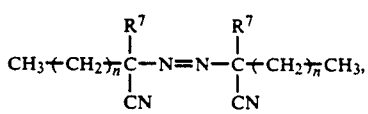

wherein $R^7$ is an alkyl having from 1 to 3 carbon atoms, and wherein n is an integer from 0 to 6, or is an acyl peroxide represented by the following general structural formula:

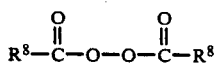

and wherein $R^8$ is an alkyl having from 1 to 15 carbon atoms.

17. The polymer of claim 13, wherein said first initiator fragment is a bis-azocyano acid having the general structural formula:

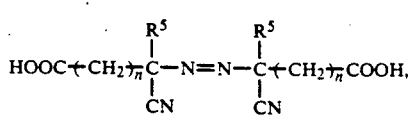

wherein $R^5$ is an alkyl having from 1 to 3 carbon atoms, and wherein n is a integer of from 1 to 6, or a peroxide having the following structural formula:

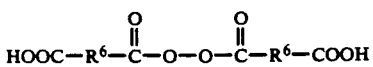

wherein $R^6$ is an alkyl having from 2 to 6 carbon atoms, and wherein said second initiator fragment is a bis-azocyano represented by the general structural formula:

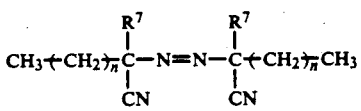

wherein $R^7$ is an alkyl having from 1 to 3 carbon atoms, and wherein n is an integer from 0 to 6, or is an acyl peroxide represented by the general structural formula:

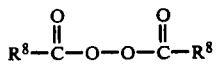

wherein $R^8$ is an alkyl having from 1 to 15 carbon atoms.

18. The polymer of claim 1, wherein said first initiator fragment is a bis-azocyano acid selected from the group consisting of azodicyanobutyric acid, and azodicyanovaleric acid (ADVA), or a peroxide selected from the group consisting of succinic acid peroxide, and glutaric acid peroxide; and wherein said second initiator fragment is 2,2'-azobis(2-methylpropionitrile), or an acyl peroxide selected from the group consisting of diacetyl peroxide, dilauryl peroxide, didecanoyl peroxide, diisononanoyl peroxide, and dibenzoyl peroxide 19. The polymer of claim 2, wherein said first initiator fragment X is a bis-azocyano acid selected from the group consisting of azodicyanobutyric acid, and azodicyanovaleric acid (ADVA), or a peroxide selected from the group consisting of succinic acid peroxide, and glutaric acid peroxide; and wherein said second initiator fragment is 2,2'-azobis(2-methylpropionitrile), or an acyl peroxide selected from the group consisting of diacetyl peroxide, dilauryl peroxide, didecanoyl peroxide, diisononanoyl peroxide, and dibenzoyl peroxide.

20. The polymer of claim 5, wherein said first initiator fragment X is a bis-azocyano acid selected from the group consisting of azodicyanobutyric acid, and azodicyanovaleric acid (ADVA), or a peroxide selected from the group consisting of succinic acid peroxide, and glutaric acid peroxide; and wherein said second initiator fragment is 2,2'-azobis(2-methylpropionitrile), or an acyl peroxide selected from the group consisting of diacetyl peroxide, dilauryl peroxide, didecanoyl peroxide, diisononanoyl peroxide, and dibenzoyl peroxide.

21. The polymer of claim 9, wherein said first initiator fragment X is a bis-azocyano acid selected from the group consisting of azodicyanobutyric acid, and azodicyanovaleric acid (ADVA), or a peroxide selected from the group consisting of succinic acid peroxide, and glutaric acid peroxide; and wherein said second initiator fragment is 2,2'-azobis(2-methylpropionitrile), or an acyl peroxide selected from the group consisting of diacetyl peroxide, dilauryl peroxide, didecanoyl peroxide, diisononanoyl peroxide, and dibenzoyl peroxide.

22. The polymer of claim 13, wherein said first initiator fragment X is a bis-azocyano acid selected from the group consisting of azodicyanobutyric acid, and azodicyanovaleric acid (ADVA), or a peroxide selected from the group consisting of succinic acid peroxide, and glutaric acid peroxide; and wherein said second initiator fragment is 2,2'-azobis(2-methylpropionitrile), or an acyl peroxide selected from the group consisting of diacetyl peroxide, dilauroyl peroxide, didecanoyl peroxide, diisononanoyl peroxide, and dibenzoyl peroxide.

23. A process for providing a low viscosity statistical monofunctional carboxyl-terminated reactive liquid polymer comprising the steps of: initially mixing and reacting in a reactor vessel at least one vinyl monomer having at least one terminal vinyl group and a portion of initiator mixture, and comonomer if copolymerizing, in solvent, then after bringing the temperature to a polymerization temperature ranging from about 40° C. to about 120° C., polymerizing said vinyl monomer, and comonomer if copolymerizing, by adding and continuously metering the remaining initiator mixture, and comonomer if copolymerizing, to the vessel.

24. The process of claim 23, wherein the initiator mixture is a mixture of a first initiator fragment having a reactive carboxyl end group and a second initiator fragment having a non-reactive end group.

25. The process of claim 24, wherein said first initiator fragment is difunctional and is utilized in an amount of from about 0.2 percent to about 90 percent, and wherein said second initiator fragment is nonfunctional and is utilized in an amount of from about 10 percent to about 99.8 percent, by molarity of said difunctional and nonfunctional initiator fragments.

26. The process of claim 24, wherein said first initiator fragment is difunctional and is utilized in an amount of from about 30 percent to about 75 percent, and wherein said second initiator fragment is nonfunctional and is utilized in an amount of from about 25 percent to about 70 percent, by molarity of said difunctional and nonfunctional initiator fragments.

27. The process of claim 24, wherein said first initiator fragment is difunctional and is utilized in an amount of from about 40 percent to about 60 percent, and wherein said second initiator fragment is nonfunctional and is utilized in an amount of from about 40 percent to about 60 percent, by molarity of said difunctional and nonfunctional initiator fragments.

28. The process of claim 24, wherein said first initiator fragment is difunctional and is utilized in an amount of about 50 percent, and wherein said second initiator fragment is nonfunctional and is utilized in an amount of from about 50 percent, by molarity of said difunctional and nonfunctional initiator fragments.

29. The process of claim 23, wherein the carboxyl-terminated reactive liquid polymer is, statistically by weight, from about 5 percent to about 50 percent monofunctional, from about 5 percent to about 90 percent difunctional, and from about 5 percent to about 90 percent nonfunctional.

30. The process of claim 24, wherein the carboxyl-terminated reactive liquid polymer is, statistically by weight, from about 10 percent to about 50 percent monofunctional, from about 10 percent to about 50 percent difunctional, and from about 10 percent to about 50 percent nonfunctional.

31. The process of claim 26, wherein the carboxyl-terminated reactive liquid polymer is, statistically by weight, about 50 percent monofunctional, about 25 percent difunctional, and about 25 percent nonfunctional.

32. The process of claim 28, wherein the carboxyl-terminated liquid polymer is, statistically by weight, about 50 percent monofunctional, about 25 percent difunctional, and about 25 percent nonfunctional.

33. The process of claim 23, wherein the reaction temperature is from about 70° C. to about 100° C.

34. The process of claim 30, wherein the reaction temperature is from about 70° C. to about 90° C.

35. The process of claim 32, wherein the reaction temperature is from about 70° C. to about 90° C.

36. A low viscosity monofunctinoal polymer product, comprising:
a blend of statistical monofunctional amine-terminated reactive liquid polymers (RLP) having a backbone of carbon-carbon linkages derived from free radical polymerization of monomers, said blend containing difunctional amine-terminated RLP, monofunctional amine-terminated RLP, and nonfunctional terminated RLP, said free radical polymerization being accomplished by utilizing a mixture of a first initiator fragment having a reactive carboxyl end group and a second initiator fragment having a non-reactive end group to form a statistical monofunctional carboxyl-terminated reactive liquid polymer, and wherein said statistical monofunctional carboxyl-terminated polymer is reacted with a polyamine containing primary or secondary amine groups.

37. The polymer of claim 36, wherein said polyamine has the formula

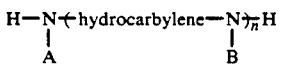

wherein said hydrocarbylene portion has from about 2 to about 20 carbon atoms, wherein A and B, independently, are substantially hydrocarbon or hydrogen,
an amine-terminated polyether having the formula

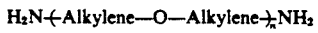

wherein n is an integer from about 2 to about 100, and each Alkylene, independently, has from about 2 to about 10 carbon atoms,
an amine having the formula

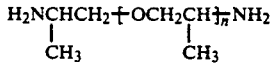

wherein n is an integer from 2 to about 100,
an amine having the formula

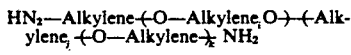

wherein each Alkylene, independently, has from about 2 to about 10 carbon atoms, and wherein i plus k is an integer of from about 2 to about 25, and j is an integer of from about 1 to about 200, or
an amine having the formula

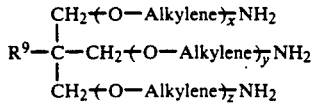

wherein each Alkylene, independently, has from about 2 to about 10 carbon atoms, and the total number of x+y+z integers is from about 2 to about 100 and $R^9$ is hydrogen or an aliphatic group having from 1 to 5 carbon atoms; and
wherein the monomers comprise at least one vinyl monomer having at least one terminal group.

38. The polymer of claim 37, wherein said vinyl monomer is a diene containing 4 to 10 carbon atoms, a vinyl ester of carboxylic acid containing 2 to 8 carbon atoms, an allyl ester of carboxylic acid containing 2 to 8 carbon atoms, a vinyl ether of alkyl radicals containing 1 to 8 carbon atoms, an allyl ether of alkyl radicals containing to 8 carbon atoms, or an acrylate having the following general structural formula

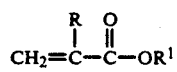

wherein R is hydrogen or an alkyl radical containing 1 to 3 carbon atoms, and $R^1$ is an alkyl radical containing 1 to 8 carbon atoms, or an alkoxyalkyl, or an alkylthioalkyl, or a cyanoalkyl having from 2 to 12 carbon atoms, and wherein the mole ratio of said polyamine to said statistical monofunctional carboxyl-terminated polymer is from about 1.0 to about 5.0.

39. The polymer of claim 38, wherein said vinyl monomer is isoprene, butadiene, 2-isopropyl-1,3-butadiene, chloroprene, vinyl acetate, vinyl propionate, allyl acetate, vinyl methyl ether, allyl methyl ether, ethyl acrylate, butyl acrylate, hexyl acrylate, 2-ethylhexyl acrylate, dodecyl acrylate, octadecyl acrylate, methoxyethyl acrylate, butoxyethyl acrylate, hexylthioethyl acrylate, α-cyanoethyl acrylate, cyanooctyl acrylate, methyl methacrylate, ethyl methacrylate, or octylmethacrylate, and wherein said polyamine is hexanediamine, methylpentamethylene diamine, ethylenediamine, diethylenetriamine, triethylenetetramine, tetraethylenepentamine, pentaethylenehexamine, isophoronediamine, MDA, iminobispropylamine, aminoethylpiperazine, and combinations thereof.

40. The polymer of claim 39, wherein said vinyl monomer is butadiene, and wherein said polyamine is aminoethylpiperazine, and wherein the mole ratio of said polyamine to said statistical monofunctional carboxyl-terminated polymer is from about 1.0 to about 2.0.

41. The polymer of claim 40, wherein the viscosity of said statistical monofunctional amine-terminated reactive polymer is less than 400,000 mPa's and wherein the number average molecular weight is from about 1,000 to about 13,000.

42. The polymer of claim 37, wherein said vinyl monomer is copolymerized with up to about 50 percent by weight of at least one comonomer selected from the group consisting of vinyl aromatics, vinyl nitriles, vinyl halides, vinyl acids, amides of olefinically unsaturated carboxylic acids, allyl alcohols, and combinations thereof.

43. The polymer of claim 39, wherein said vinyl monomer is copolymerized with up to about 50 percent by weight of at least one comonomer selected from the group consisting of vinyl aromatics, vinyl nitriles, vinyl halides, vinyl acids, amides of olefinically unsaturated carboxylic acids, allyl alcohols, and combinations thereof.

44. The polymer of claim 37, wherein said vinyl monomer is copolymerized with acrylonitrile.

45. The polymer of claim 44, wherein said vinyl monomer is copolymerized with acrylonitrile.

46. The polymer of claim 44, wherein the polymer comprises from about 10 percent to about 35 percent by weight of acrylonitrile.

47. The polymer of claim 45, wherein the polymer comprises from about 10 percent to about 26 percent by weight of acrylonitrile.

48. The polymer of claim 37, wherein said first initiator fragment is a difunctional organic azo compound or a peroxide; and wherein said second initiator fragment is a nonfunctional azo compound or a peroxide.

49. The polymer of claim 43, wherein said first initiator fragment is a difunctional organic azo compound or a peroxide; and wherein said second initiator fragment is a nonfunctional azo compound or a peroxide 50. The polymer of claim 39, wherein said first initiator fragment is a bis-azocyano acid having the general structural formula:

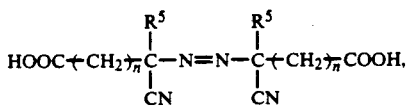

wherein $R^5$ is an alkyl having from 1 to 3 carbon atoms, and wherein n is a integer of from 1 to 6, or a peroxide having the general structural formula:

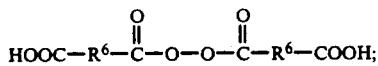

wherein $R^6$ is an alkyl having from 2 to 6 carbon atoms, and wherein said second initiator fragment is a bis-azocyano represented by the general structural formula:

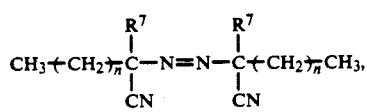

wherein $R^7$ is an alkyl having from 1 to 3 carbon atoms, and wherein n is an integer from 0 to 6, or is an acyl peroxide represented by the following general structural formula:

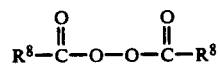

and wherein $R^8$ is an alkyl having from 1 to 15 carbon atoms.

51. The polymer of claim 44, wherein said first initiator fragment is a bis-azocyano acid having the general structural formula:

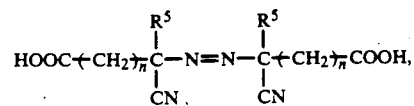

wherein $R^5$ is an alkyl having from 1 to 3 carbon atoms, and wherein n is a integer of from 1 to 6, or a peroxide having the general structural formula:

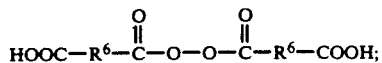

wherein $R^6$ is an alkyl having from 2 to 6 carbon atoms, and wherein said second initiator fragment is bis-azocyano represented by the general structural formula

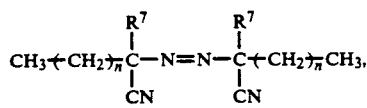

wherein $R^7$ is an alkyl having from 1 to 3 carbon atoms, and wherein n is an integer from 0 to 6, or is an acyl peroxide represented by the following general structural formula:

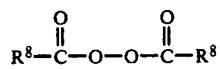

and wherein $R^8$ is an alkyl having from 1 to 15 carbon atoms.

52. The polymer of claim 40, wherein said first initiator fragment is a bis-azocyano acid selected from the group consisting of azodicyanobutyric acid, and azodicyanovaleric acid (ADVA), or a peroxide selected from the group consisting of succinic acid peroxide, and glutaric acid peroxide; and wherein said second initiator fragment is 2,2'-azobis(2-methylpropionitrile), or an acyl peroxide selected from the group consisting of diacetyl peroxide, dilauroyl peroxide, didecanoyl peroxide, diisononanoyl peroxide, and dibenzoyl peroxide.

53. The polymer of claim 43, wherein said first initiator fragment is a bis-azocyano acid selected from the group consisting of azodicyanobutyric acid, and azodicyanovaleric acid (ADVA), or a peroxide selected from the group consisting of succinic acid peroxide, and glutaric acid peroxide; and wherein said second initiator fragment is 2,2'-azobis(2-methylpropionitrile), or an acyl peroxide selected from the group consisting of diacetyl peroxide, dilauroyl peroxide, didecanoyl peroxide, diisononanoyl peroxide, and dibenzoyl peroxide.

54. The polymer of claim 47, wherein said first initiator fragment is a bis-azocyano acid selected from the group consisting of azodicyanobutyric acid, and azodicyanovaleric acid (ADVA), or a peroxide selected from the group consisting of succinic acid peroxide, and glutaric acid peroxide; and wherein said second initiator fragment is 2,2'-azobis(2-methylpropionitrile), or an acyl peroxide selected from the group consisting of diacetyl peroxide, dilauroyl peroxide, didecanoyl peroxide, diisononanoyl peroxide, and dibenzoyl peroxide.

55. A process for providing a low viscosity statistical monofunctional amine-terminated reactive polymer comprising the steps of:
reacting a polyamine with a statistical monofunctional carboxyl-terminated reactive liquid polymer at an effective polymerization temperature.

56. A process according to claim 55, wherein said polyamine contains primary or secondary amine groups, wherein said polyamine has the formula

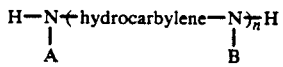

wherein said hydrocarbylene portion has from about 2 to about 20 carbon atoms, wherein A and B, independently, are substantially hydrocarbon or hydrogen, an amine-terminated polyether having the formula H₂N—(Alkylene—O—Alkylene)ₙNH₂   (POLYFUNCwherein n is an integer from about 2 to about 100, and each Alkylene, independently, has from about 2 to about 10 carbon atoms, an amine having the formula

wherein n is an integer from 2 to about 100, an amine having the formula

H₂N—Alkylene—(O—Alkylene)ᵢ—(O—Alkyleneⱼ—(O—Alkylene)ₖ—NH₂ wherein each Alkylene, independently, has from about 2 to about 10 carbon atoms, and wherein i plus k is an integers of from about 2 to about 25, and j is an integer of from about 1 to about 200, or an amine having the formula

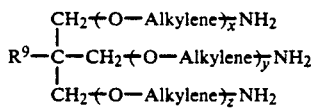

wherein each Alkylene, independently, has from about 2 to about 10 carbon atoms, and the total number of x+y+z integers is from about 2 to about 100, and wherein $R^9$ is hydrogen or an aliphatic group having from 1 to 5 carbon atoms; and wherein the monomers comprise at least one vinyl monomer having at least one terminal group.

57. A process according to claim 56, wherein the mole ratio of said polyamine to said statistical monofunctional carboxyl-terminated reactive liquid polymer is from about 1.0 to about 5.0 and wherein said polymerization temperature is from about 120° C. to about 200° C.

58. A process according to claim 57, wherein said polyamine is hexanediamine, methylpentamethylene diamine, ethylenediamine, diethylenetriamine, triethylenetetramine, tetraethylenepentamine, pentaethylenehexamine, isophoronediamine, MDA, iminobispropylamine, aminoethylpiperazine, and combinations thereof.

59. A process according to claim 58, wherein said polyamine is aminoethylpiperazine, wherein said mole ratio is from about 1.0 to about 2.0 and wherein said polymerization temperature is from about 140° C. to about 160° C.

60. A process for providing a low viscosity statistical monofunctional amine-terminated reactive polymer comprising the steps of:

reacting a polyamine with a statistical monofunctional carboxyl-terminated reactive liquid polymer at an effective polymerization temperature,
and wherein said statistical monofunctional carboxyl-terminated reactive liquid polymer is made by a process comprising the steps of initially mixing and reacting in a reactor vessel at least one vinyl monomer having at least one terminal vinyl group and a portion of initiator mixture, and comonomer if copolymerizing, in solvent, then after bringing the temperature to a polymerization temperature ranging from about 40° C. to about 120° C., polymerizing said vinyl monomer, and comonomer if copolymerizing, by adding and continuously metering the remaining initiator mixture, and comonomer if copolymerizing, to the vessel.

61. A process according to claim 60, wherein said polyamine wherein said polyamine contains primary or secondary amine groups, wherein said polyamine has the formula

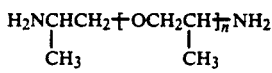

wherein said hydrocarbylene portion has from about 2 to about 20 carbon atoms, wherein A and B, independently, are substantially hydrocarbon or hydrogen, an amine-terminated polyether having the formula H₂N—Alkylene—O—Alkyleneₙ NH₂ wherein n is an integer from about 2 to about 100, and each Alkylene, independently, has from about 2 to about 10 carbon atoms, an amine having the formula

wherein n is an integer from 2 to about 100, an amine having the formula

H₂N—Alkylene—(O—Alkylene)ᵢ—(O—Alkyleneⱼ—(O—Alkylene)ₖ—NH₂ wherein each Alkylene, independently, has from about 2 to about 10 carbon atoms, and wherein i plus k is an integer of from about 2 to about 25, and j is an integer of from about 1 to about 200, or an amine having the formula

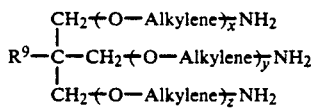

wherein each "Alkylene," independently, has from about to about 10 carbon atoms, and the total number of x+y+z integers is from about 2 to about 100 and $R^8$ is hydrogen or an aliphatic group having from 1 to 5 carbon atoms;
and wherein the monomers comprise at least one vinyl monomer having at least one terminal group, and wherein said initiator mixture is a mixture of a first initiator fragment having a reactive carboxyl end group and a second initiator fragment having a nonreactive end group.

62. A process according to claim 61, wherein said first initiator fragment is difunctional and is utilized in an amount of from about 0.2 percent to about 90 percent, and wherein said second initiator fragment is nonfunctional and is utilized in an amount of from about 10 percent to about 99.8 percent, by molarity of said difunctional and nonfunctional initiator fragments, wherein the mole ratio of said polyamine to said statistical monofunctional carboxyl-terminated reactive liquid polymer is from about 1.0 to about 5.0, and wherein said polymerization temperature is from about 120° C. to about 200° C.

63. A process according to claim 62, wherein said first initiator fragment is difunctional and is utilized in an amount of from about 40 percent to about 60 percent, and wherein said second initiator fragment is nonfunctional and is utilized in an amount of from about 40 percent to about 60 percent, by molarity of said difunctional and nonfunctional initiator fragments, and wherein said polyamine is hexanediamine, methylpentamethylene diamine, ethylenediamine, diethylenetriamine, triethylenetetramine, tetraethylenepentamine, pentaethylenehexamine, isophoronediamine, MDA, iminobispropylamine, aminoethylpiperazine, and combinations thereof.

64. A process according to claim 63, wherein the carboxyl-terminated reactive liquid polymer is, statistically by weight, from about 5 percent to about 50 percent monofunctional, from about 5 percent to about 90 percent difunctional, and from about 5 percent to about 90 percent nonfunctional.

65. A process according to claim 63, wherein the carboxyl-terminated reactive liquid polymer is, statistically by weight, from about 10 percent to about 50 percent monofunctional, from about 10 percent to about 50 percent difunctional, and from about 10 percent to about 50 percent nonfunctional, and wherein said polyamine is aminoethylpiperazine, wherein said mole ratio is from about 1.0 to about 2.0, and wherein said polymerization temperature is from about 140° C. to about 160° C.

66. A process according to claim 65, wherein the carboxyl-terminated reactive liquid polymer is, statistically by weight, about 50 percent monofunctional, about 25 percent difunctional, and about 25 percent nonfunctional.

67. A process according to claim 61 wherein said vinyl monomer is a diene containing 4 to 10 carbon atoms, a vinyl ester of carboxylic acid containing 2 to 8 carbon atoms, an allyl ester of carboxylic acid containing 2 to 8 carbon atoms, a vinyl ether of alkyl radicals containing 1 to 8 carbon atoms, an allyl ether of alkyl radicals containing 1 to 8 carbon atoms, or an acrylate having the following general structural formula

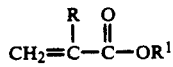

wherein R is hydrogen or an alkyl radical containing 1 to 3 carbon atoms, and $R^1$ is an alkyl radical containing 1 to 8 carbon atoms, or an alkoxyalkyl, or an alkylthioalkyl, or a cyanoalkyl having from 2 to 12 carbon atoms.

68. A process according to claim 67, wherein said first initiator fragment is difunctional and is utilized in an amount of from about 0.2 percent to about 90 percent, and wherein said second initiator fragment is nonfunctional and is utilized in an amount of from about 10 percent to about 99.8 percent, by molarity of said difunctional and nonfunctional initiator fragments, wherein the mole ratio of said polyamine to said statistical monofunctional carboxyl-terminated reactive liquid polymer is from about 1.0 to about 5.0 and wherein said polymerization temperature is from about 120° C. to about 200° C., and wherein said vinyl monomer is isoprene, butadiene, 2-isopropyl-1,3-butadiene, chloroprene, vinyl acetate, vinyl propionate, allyl acetate, vinyl methyl ether, allyl methyl ether, ethyl acrylate, butyl acrylate, hexyl acrylate, 2-ethylhexyl acrylate, dodecyl acrylate, octadecyl acrylate, methoxyethyl acrylate, butoxyethyl acrylate, hexylthioethyl acrylate, α-cyanoethyl acrylate, cyanooctyl acrylate, methyl methacrylate, ethyl methacrylate, or octylmethacrylate.

69. A process according to claim 68, wherein said first initiator fragment is difunctional and is utilized in an amount of from about 40 percent to about 60 percent, and wherein said second initiator fragment is nonfunctional and is utilized in an amount of from about 40 percent to about 60 percent, by molarity of said difunctional and nonfunctional initiator fragments, and wherein said polyamine is is hexanediamine, methylpentamethylene diamine, ethylenediamine, diethylenetriamine, triethylenetetramine, tetraethylenepentamine, pentaethylenehexamine, isophoronediamine, MDA, iminobispropylamine, aminoethylpiperazine, and combinations thereof, and wherein said vinyl polymer is a copolymer made from butadiene and acrylonitrile.

70. A process according to claim 69, wherein the carboxyl-terminated reactive liquid polymer is, statistically by weight, from about 5 percent to about 50 percent monofunctional, from about 5 percent to about 90 percent difunctional, and from about 5 percent to about 90 percent nonfunctional, and wherein said copolymer is made from about 10 percent to about 35 percent by weight of acrylonitrile.

71. A process according to claim 70, wherein the carboxyl-terminated reactive liquid polymer is, statistically by weight, about 50 percent monofunctional, about 25 percent difunctional, and about 25 percent nonfunctional, and wherein said amount of said acrylonitrile is from about 10 percent to about 26 percent by weight.

72. A process according to claim 71, wherein said first initiator fragment is a bis-azocyano acid having the general structural formula:

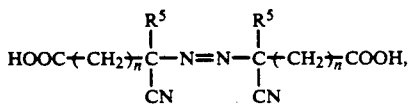

wherein $R^5$ is an alkyl having from 1 to 3 carbon atoms, and wherein n is a integer of from 1 to 6, or a peroxide having the general structural formula:

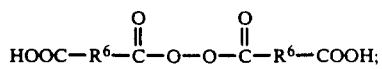

wherein R⁶ is an alkyl having from 2 to 6 carbon atoms, and wherein said second initiator fragment is a bis-azocyano represented by the general structural formula:

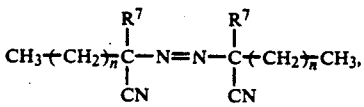

wherein R⁷ is an alkyl having from 1 to 3 carbon atoms, and wherein n is an integer from 0 to 6, or is an acyl peroxide represented by the following general structural formula:

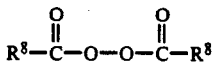

and wherein R⁸ is an alkyl having from 1 to 15 carbon atoms.

73. A process according to claim 71, wherein said first initiator fragment is a bis-azocyano acid selected from the group consisting of azodicyanobutyric acid, and azodicyanovaleric acid (ADVA), or a peroxide selected from the group consisting of succinic acid peroxide, and glutaric acid peroxide; and wherein said second initiator fragment is 2,2'-azobis(2-methylpropionitrile), or an acyl peroxide selected from the group consisting of diacetyl peroxide, dilauroyl peroxide, didecanoyl peroxide, diisononanoyl peroxide, and dibenzoyl peroxide.

74. A low viscosity monofunctional polymer product, comprising:
a blend of statistical monofunctional epoxy-terminated reactive polymers (RP) having a backbone of carbon-carbon linkages derived from free radical polymerization of monomers, said blend containing difunctional epoxy-terminated RP, monofunctional epoxy-terminated RP, and nonfunctional terminated RP, said free radical polymerization being accomplished by utilizing a mixture of a first initiator fragment having a reactive carboxyl end group and a second initiator fragment having a non-reactive end group to form a statistical monofunctional carboxyl-terminated reactive liquid rubber, and wherein said statistical monofunctional carboxyl-terminated polymer is reacted with an epoxy resin.

75. The polymer of claim 74, wherein said epoxy resin is a polyhydric phenol polyether alcohol, a glycidyl ether of a novolac resin, a glycidyl ether of a mono-, di-, or trihydric phenol, a glycidyl ether of a bisphenol, a glycidyl ether of a polynuclear phenol, an epoxy resin made from a diphenolic acid, a glycidyl ether of an aliphatic polyol, a glycidyl ester, a glycidyl epoxy containing nitrogen, a glycidyl derivative of cyanuric acid, a glycidyl resin from melamine, a glycidyl amine, a glycidyl triazines, a thioglycidyl resin, a silicon-glycidyl resin, a fluorine glycidyl resin, and an epoxy resin made from an unsaturated monoepoxy, an epoxy resin made from a monoepoxy alcohol, an epoxy resin made from a monoepoxy by ester interchange, an epoxy resin made from glycidaldehyde, an epoxy resin made from a polyglycidyl compound containing unsaturation, an epoxy resin which is synthesized from olefins and chloracetyls, or an epoxy-resin adduct of the above, and
wherein said monomers are ones comprising at least one vinyl monomer having at least one terminal vinyl group.

76. The polymer of claim 75, wherein said vinyl monomer is a diene containing 4 to 10 carbon atoms, a vinyl ester of carboxylic acid containing 2 to 8 carbon atoms, an allyl ester of carboxylic acid containing 2 to 8 carbon atoms, a vinyl ether of alkyl radicals containing 1 to 8 carbon atoms, an allyl ether of alkyl radicals containing 1 to 8 carbon atoms, or an acrylate having the following general structural formula

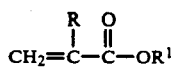

wherein R is hydrogen or an alkyl radical containing 1 to 3 carbon atoms, and R¹ is an alkyl radical containing 1 to 8 carbon atoms, or an alkoxyalkyl, or an alkylthioalkyl, or a cyanoalkyl having from 2 to 12 carbon atom, and
wherein the mole ratio of said epoxy resin to said statistical monofunctional carboxyl-terminated reactive polymer is from about 0.90 to about 40.

77. The polymer of claim 76, wherein said vinyl monomer is isoprene, butadiene, 2-isopropyl-1,3-butadiene, chloroprene, vinyl acetate, vinyl propionate, allyl acetate, vinyl methyl ether, allky methyl ether, ethyl acrylate, butyl acrylate, hexyl acrylate, 2-ethylhexyl acrylate, dodecyl acrylate, octadecyl acrylate, methoxyethyl acrylate, butoxyethyl acrylate, hexylthioethyl acrylate, α-cyanoethyl acrylate, cyanooctyl acrylate, methyl methacrylate, ethyl methacrylate, or octylmethacrylate, and
wherein said epoxy resin is

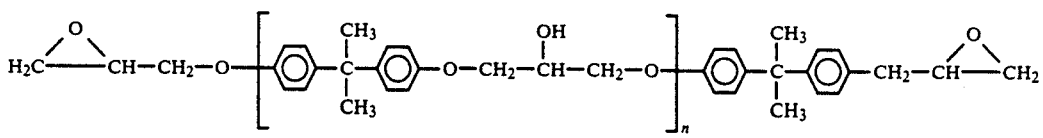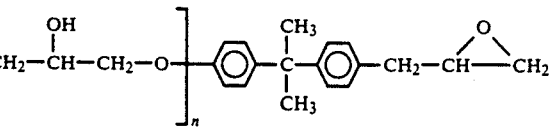

wherein n is an integer from 0 to 18.

78. The polymer of claim 77, wherein said vinyl monomer is butadiene, wherein n is from 0 to about 14.3, and wherein said molar ratio is from about 0.9 to about 20.

79. The polymer of claim 78, wherein the viscosity of said statistical monofunctinoal epoxy-terminated reactive liquid polymer is less than 500,000 mPas, and wherein the number average molecular weight of said polymer is from about 200 to about 13,000.

80. The polymer of claim 78, wherein said vinyl monomer is copolymerized with up to about 50 percent by weight of at least one comonomer selected from the group consisting of vinyl aromatics, vinyl nitriles, vinyl halides, vinyl acids, amides of olefinically unsaturated carboxylic acids, allyl alcohols, and combinations thereof.

81. The polymer of claim 77, wherein said vinyl monomer is copolymerized with up to about 50 percent by weight of at least one comonomer selected from the group consisting of vinyl aromatics, vinyl nitriles, vinyl halides, vinyl acids, amides of olefinically unsaturated carboxylic acids, allyl alcohols, and combinations thereof.

82. The polymer of claim 75, wherein said backbone polymer is a copolymer of butadiene and acrylonitrile.

83. The polymer of claim 77, wherein said backbone polymer is a copolymer of butadiene and acrylonitrile, and wherein the amount of said acrylonitrile in said copolymer is from about 10 percent to about 35 percent by weight.

84. The polymer of claim 83, wherein n is from about 0 to about 14.3, wherein the viscosity of said statistical monofunctional epoxy-terminated reactive polymer is 1,000,000 mPas or less, wherein the number average molecular weight of said polymer is from about 200 to about 13,000, wherein said mole ratio is from about 0.9 to about 20, and wherein the amount of said acrylonitrile is from about 10 to about 26 percent by weight.

85. The polymer of claim 75, wherein said first initiator fragment is a difunctional organic azo compound or a peroxide; and wherein said second initiator fragment is a nonfunctional azo compound or a peroxide.

86. The polymer of claim 77, wherein said first initiator fragment is a bis-azocyano acid having the general structural formula:

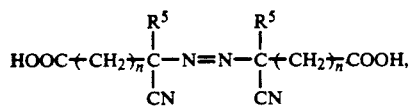

wherein $R^5$ is an alkyl having from 2 to 3 carbon atoms, and wherein n is a integer of from 1 to 6, or a peroxide having the general structural formula:

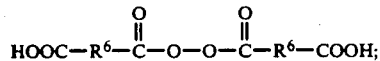

wherein $R^6$ is an alkyl having from 2 to 6 carbon atoms, and wherein said second initiator fragment is a bis-azocyano represented by the general structural formula:

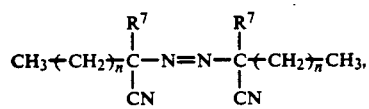

wherein $R^7$ is an alkyl having from 1 to 3 carbon atoms, and wherein n is an integer from 0 to 6, or is an acyl peroxide represented by the following general structural formula:

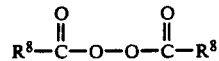

and wherein $R^8$ is an alkyl having from 1 to 15 carbon atoms.

87. The polymer of claim 77, wherein said first initiator fragment is a bis-azocyano acid selected from the group consisting of azodicyanobutyric acid, and azodicyanovaleric acid (ADVA), or a peroxide selected from the group consisting of succinic acid peroxide, and glutaric acid peroxide; and wherein said second initiator fragment is 2,2'-azobis(2-methylpropionitrile), or an acyl peroxide selected from the group consisting of diacetyl peroxide, dilauryl peroxide, didecanoyl peroxide, diisononanoyl peroxide, and dibenzoyl peroxide.

88. The polymer of claim 78, wherein said first initiator fragment is a bis-azocyano acid selected from the group consisting of azodicyanobutyric acid, and azodicyanovaleric acid (ADVA), or a peroxide selected from the group consisting of succinic acid peroxide, and glutaric acid peroxide; and wherein said second initiator fragment is 2,2'-azobis(2-methylpropionitrile), or an acyl peroxide selected from the group consisting of diacetyl peroxide, dilauryl peroxide, didecanoyl peroxide, diisononanoyl peroxide, and dibenzoyl peroxide.

89. The polymer of claim 84, wherein said first initiator fragment is a bis-azocyano acid selected from the group consisting of azodicyanobutyric acid, and azodicyanovaleric acid (ADVA), or a peroxide selected from the group consisting of succinic acid peroxide, and glutaric acid peroxide; and wherein said second initiator fragment is 2,2'-azobis(2-methylpropionitrile), or an acyl peroxide selected from the group consisting of diacetyl peroxide, dilauryl peroxide, didecanoyl peroxide, diisononanoyl peroxide, and dibenzoyl peroxide.

90. A process for providing a low viscosity statistical monofunctional epoxy-terminated reactive polymer comprising the steps of:
reacting an epoxy resin with a statistical monofunctional carboxyl-terminated reactive liquid polymer at an effective temperature and optionally in the presence of a catalyst.

91. A process according to claim 90, wherein said epoxy resin is a polyhydric phenol polyether alcohol, a glycidyl ether of a novolac resin, a glycidyl ether of a mono-, di-, or trihydric phenol, a glycidyl ether of a bisphenol, a glycidyl ether of a polynuclear phenol, an epoxy resin made from a diphenolic acid, a glycidyl ether of an aliphatic polyol, a glycidyl ester, a glycidyl epoxy containing nitrogen, a glycidyl derivative of cyanuric acid, a glycidyl resin from melamine, a glycidyl amine, a glycidyl triazines, a thioglycidyl resin, a silicon-glycidyl resin, a fluorine glycidyl resin, and an epoxy resin made from an unsaturated monoepoxy, an epoxy resin made from a monoepoxy alcohol, an epoxy resin made from a monoepoxy by ester interchange, an epoxy resin made from glycidaldehyde, an epoxy resin made from a polyglycidyl compound containing unsaturation, an epoxy resin which is synthesized from olefins and chloroacetyls, or an epoxy-resin adduct of the above.

92. A process according to claim 91, wherein the mole ratio of said epoxy resin to said statistical monofunctional carboxyl-terminated reactive liquid polymer is from about 0.9 to about 40, wherein said reaction temperature is from about 80° C. to about 180° C.

93. A process according to claim 92, wherein said epoxy resin is

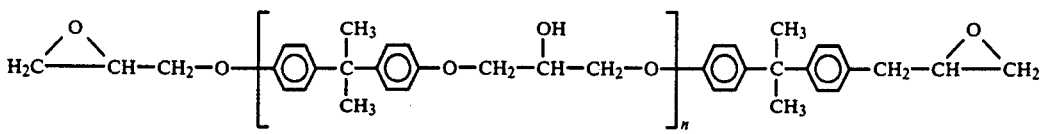

wherein n is an integer from 0 to 18.

94. A process according to claim 93, wherein n is an integer of from 0 to about 14.3, wherein said mole ratio is from about 0.90 to about 20, and wherein said reaction temperature is from about 90° C. to about 140° C.

95. A process according to claim 94, including said catalyst, and wherein the amount of said catalyst is up to about 1 percent by weight based upon the total weight of epoxy resin in said statistical monofunctional carboxyl-terminated reactive liquid polymer.

96. A process for providing a low viscosity statistical monofunctional epoxy-terminated reactive polymer comprising the steps of:
reacting an epoxy resin with a statistical monofunctional carboxyl-terminated reactive liquid polymer at an effective temperature and optionally in the presence of a catalyst,
wherein said statistical monofunctional carboxyl-terminated reactive liquid polymer is made by a process comprising the steps of initially mixing and reacting in a reactor vessel at least one vinyl monomer having at least one terminal vinyl group and a portion of initiator mixture, and comonomer if copolymerizing, in solvent, then after bringing the temperature to a polymerization temperature ranging from about 40° C. to about 120° C., polymerizing said vinyl monomer, and comonomer if copolymerizing, by adding and continuously metering the remaining initiator mixture, and comonomer if copolymerizing, to the vessel.

97. A process according to claim 96, wherein said epoxy resin is a polyhydric phenol polyether alcohol, a glycidyl ether of a novolac resin, a glycidyl ether of a mono-, di-, or trihydric phenol, a glycidyl ether of a bisphenol, a glycidyl ether of a polynuclear phenol, an epoxy resin made from a diphenolic acid, a glycidyl ether of an aliphatic polyol, a glycidyl ester, a glycidyl epoxy containing nitrogen, a glycidyl derivative of cyanuric acid, a glycidyl resin from melamine, a glycidyl amine, a glycidyl triazines, a thioglycidyl resin, a silicon-glycidyl resin, a fluorine glycidyl resin, and an epoxy resin made from an unsaturated monoepoxy, an epoxy resin made from a monoepoxy alcohol, an epoxy resin made from a monoepoxy by ester interchange, an epoxy resin made from glycidaldehyde, an epoxy resin made from a polyglycidyl compound containing unsaturation, an epoxy resin which is synthesized from olefins and chloroacetyls, or an epoxy-resin adduct of the above, and
wherein the initiator mixture is a mixture of a first initiator fragment having a reactive carboxyl end group, and a second initiator fragment having a nonreactive end group.

98. A process according to claim 97, wherein said first initiator fragment is difunctional and is utilized in an amount of from about 0.2 percent to about 90 percent, and wherein said second initiator fragment is nonfunctional and is utilized in an amount of from about 10 percent to about 99.8 percent, by molarity of said difunctional and nonfunctional initiator fragments,
wherein the mole ratio of said epoxy resin to said statistical monofunctional carboxyl-terminated reactive liquid polymer is from about 0.90 to about 40, wherein said reaction temperature is from about 80° C. to about 180° C.

99. A process according to claim 98, wherein said first initiator fragment is difunctional and is utilized in an amount of from about 40 percent to about 60 percent, and wherein said second initiator fragment is nonfunctional and is utilized in an amount of from about 40 percent to about 60 percent, by molarity of said difunctional and nonfunctional initiator fragments, and
wherein said epoxy resin is

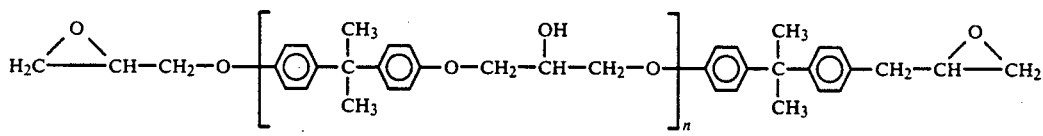

wherein n is an integer from 0 to 18.

100. A process according to claim 99, wherein the carboxyl-terminated reactive liquid polymer is, statistically by weight, from about 5 percent to about 50 percent monofunctional, from about 5 percent to about 90 percent difunctional, and from about 5 percent to about 90 percent nonfunctional.

101. A process according to claim 99, wherein the carboxyl-terminated reactive liquid polymer is, statistically by weight, from about 10 percent to about 50 percent monofunctional, from about 10 percent to about 50 percent difunctional, and from about 10 percent to about 50 percent nonfunctional, and
wherein n is an integer of from 0 to about 14.3, wherein said mole ratio is from about 0.90 to about 20, and wherein said reaction temperature is from about 90° C. to about 140° C.

102. A process according to claim 101, wherein the carboxyl-terminated reactive liquid polymer is, statistically by weight, about 50 percent monofunctional, about 25 percent difunctional, and about 25 percent nonfunctional.

103. A process according to claim 97, wherein said vinyl monomer is a diene containing 4 to 10 carbon atoms, a vinyl ester of carboxylic acid containing 2 to 8 carbon atoms, an allyl ester of carboxylic acid containing 2 to 8 carbon atoms, a vinyl ether of alkyl radicals containing 1 to 8 carbon atoms, an allyl ether of alkyl radicals containing 1 to 8 carbon atoms, or an acrylate having the following general structural formula

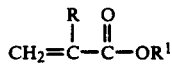

wherein R is hydrogen or an alkyl radical containing 1 to 3 carbon atoms, and RI is an alkyl radical containing 1 to 8 carbon atoms, or an alkoxyalkyl, or an alkylthioalkyl, or a cyanoalkyl having from 2 to 12 carbon atoms.

104. A process according to claim 103, wherein said vinyl monomer is isoprene, butadiene, 2-isopropyl-1,3-butadiene, chloroprene, vinyl acetate, vinyl propionate, allyl acetate, vinyl methyl ether, allyl methyl ether, ethyl acrylate, butyl acrylate, hexyl acrylate, 2-ethylhexyl acrylate, dodecyl acrylate, octadecyl acrylate, methoxyethyl acrylate, butoxyethyl acrylate, hexylthioethyl acrylate, α-cyanoethyl acrylate, cyanooctyl acrylate, methyl methacrylate, ethyl methacrylate, or octylmethacrylate, and
  wherein said first initiator fragment is difunctional and is utilized in an amount of from about 0.2 percent to about 90 percent, and wherein said second initiator fragment is nonfunctional and is utilized in an amount of from about 10 percent to about 99.8 percent, by molarity of said difunctional and nonfunctional initiator fragments, and
  wherein the mole ratio of said epoxy resin to said statistical monofunctional carboxyl-terminated reactive liquid polymer is from about 0.90 to about 40, and wherein said reaction temperature is from about 80° C. to about 180° C.

105. A process according to claim 104, wherein said backbone polymer is a copolymer made from butadiene and acrylonitrile monomers, and wherein said first initiator fragment is difunctional and is utilized in an amount of from about 40 percent to about 60 percent, and wherein said second initiator fragment is nonfunctional and is utilized in an amount of from about 40 percent to about 60 percent, by molarity of said difunctional and nonfunctional initiator fragments, and
  wherein said epoxy resin is

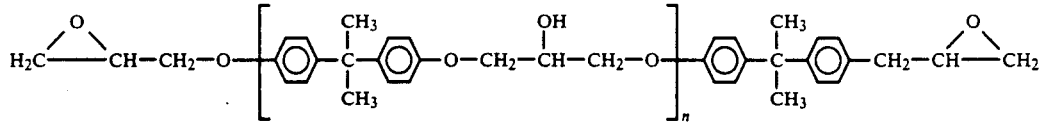

wherein n is an integer from 0 to 18.

106. A process according to claim 105, wherein the amount of said acrylonitrile in said copolymer is from about 10 to about 35 percent by weight, and wherein the carboxyl-terminated reactive liquid polymer is, statistically by weight, from about 5 percent to about 50 percent monofunctional, from about 5 percent to about 90 percent difunctional, and from about 5 percent to about 90 percent nonfunctional.

107. A process according to claim 106 wherein the amount of said acrylonitrile in said copolymer is from about 10 percent to about 26 percent by weight, and wherein the carboxyl-terminated reactive liquid polymer is, statistically by weight, from about 10 percent to about 50 percent monofunctional, from about 10 percent to about 50 percent difunctional, and from about 10 percent to about 50 percent nonfunctional, and
  wherein n is an integer of from 0 to about 14.3, wherein said mole ratio is from about 0.90 to about 20, and wherein said reaction temperature is from about 90° C. to about 140° C.

108. A process according to claim 107, wherein said first initiator fragment is a bis-azocyano acid having the general structural formula:

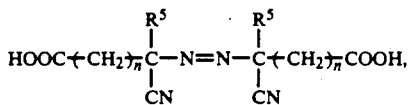

wherein $R^5$ is an alkyl having from 1 to 3 carbon atoms, and wherein n is a integer of from 1 to 6, or a peroxide having the general structural formula:

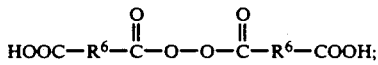

wherein $R^6$ is an alkyl having from 2 to 6 carbon atoms, and wherein said second initiator fragment is a bis-azocyano represented by the general structural formula:

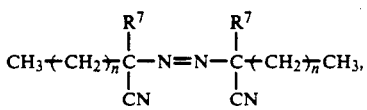

wherein $R^7$ is an alkyl having from 1 to 3 carbon atoms, and wherein n is an integer from 0 to 6, or is an acyl peroxide represented by the following general structural formula:

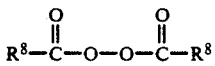

and wherein $R^8$ is an alkyl having from 1 to 15 carbon atoms.

109. A process according to claim 108, wherein said first initiator fragment is a bis-azocyano acid selected from the group consisting of azodicyanobutyric acid, and azodicyanovaleric acid (ADVA), or a peroxide selected from the group consisting of succinic acid peroxide, and glutaric acid peroxide; and wherein said second initiator fragment is 2,2'-azobis(2-methylpropionitrile), or an acyl peroxide selected from the group consisting of diacetyl peroxide, dilauryl peroxide, didecanoyl peroxide, diisononanoyl peroxide, and dibenzoyl peroxide.

* * * * *